(12) United States Patent
Tachino et al.

(10) Patent No.: US 8,023,375 B2
(45) Date of Patent: Sep. 20, 2011

(54) RECORDING/REPRODUCING DEVICE AND LASER DRIVING PULSE ADJUSTING METHOD

(75) Inventors: Ryuya Tachino, Kanagawa (JP); Hidetaka Kodama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/814,863

(22) Filed: Jun. 14, 2010

(65) Prior Publication Data

US 2011/0007617 A1    Jan. 13, 2011

(30) Foreign Application Priority Data

Jul. 7, 2009   (JP) ................................ 2009-160589

(51) Int. Cl.
   *G11B 7/00* (2006.01)
(52) U.S. Cl. ................. 369/47.53; 369/53.31; 369/47.5; 369/59.11
(58) Field of Classification Search ......................... None
   See application file for complete search history.

(56) References Cited

U.S. PATENT DOCUMENTS

| | | | | |
|---|---|---|---|---|
| 6,535,468 | B2 * | 3/2003 | Akiyama et al. | ........... 369/47.52 |
| 6,791,926 | B1 | 9/2004 | Furumiya et al. | |
| 7,248,552 | B2 | 7/2007 | Furumiya et al. | |
| 2004/0017752 | A1 | 1/2004 | Furumiya et al. | |
| 2008/0291797 | A1 * | 11/2008 | Tamaki | ........... 369/47.52 |
| 2009/0122673 | A1 | 5/2009 | Nakamura et al. | |

FOREIGN PATENT DOCUMENTS

| | | |
|---|---|---|
| EP | 1 059 630 A1 | 12/2000 |
| JP | 2000-200418 | 7/2000 |
| JP | 2008-84376 | 4/2008 |
| WO | WO 2006/109230 A2 | 10/2006 |
| WO | WO2006/112277 | 10/2006 |

OTHER PUBLICATIONS

European Search Report issued Nov. 19, 2010, in Application No./Patent No. 10167503.1-1232.

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

A recording/reproducing device includes an optical head unit which performs writing and reading of information expressed by marks and spaces on an optical recording medium by irradiating laser light onto the optical recording medium, a laser driving pulse generating unit that generates a laser driving pulse according to the recorded information to supply a laser driving signal to the optical head unit, and executes the irradiation of the laser light onto the optical head unit for recording, an evaluation value calculating unit that calculates a quality evaluation value, which is an index of recording signal quality based on a signal read from the optical recording medium by the optical head unit, and an adjustment controlling unit that performs an adjustment setting of the laser driving pulse generated in the laser driving pulse generating unit.

11 Claims, 17 Drawing Sheets

FIG. 5A

| 1 CLUSTER | 2 CLUSTERS | 2 CLUSTERS | 2 CLUSTERS | 2 CLUSTERS | 1 CLUSTER | 2 CLUSTERS | 1 CLUSTER |
|---|---|---|---|---|---|---|---|
| RECORDING POWER ADJUSTMENT RECORDING | STRATEGY CALCULATION RECORDING | STRATEGY CALCULATION RECORDING | COMPARED STRATEGY TEST RECORDING | STRATEGY CALCULATION RECORDING | REPRODUCTION PULL-IN RECORDING | CALCULATED STRATEGY TEST RECORDING | REPRODUCTION PULL-IN RECORDING |
| <1> | <2> | <3> | <4> | <5> | <6> | <7> | <8> |

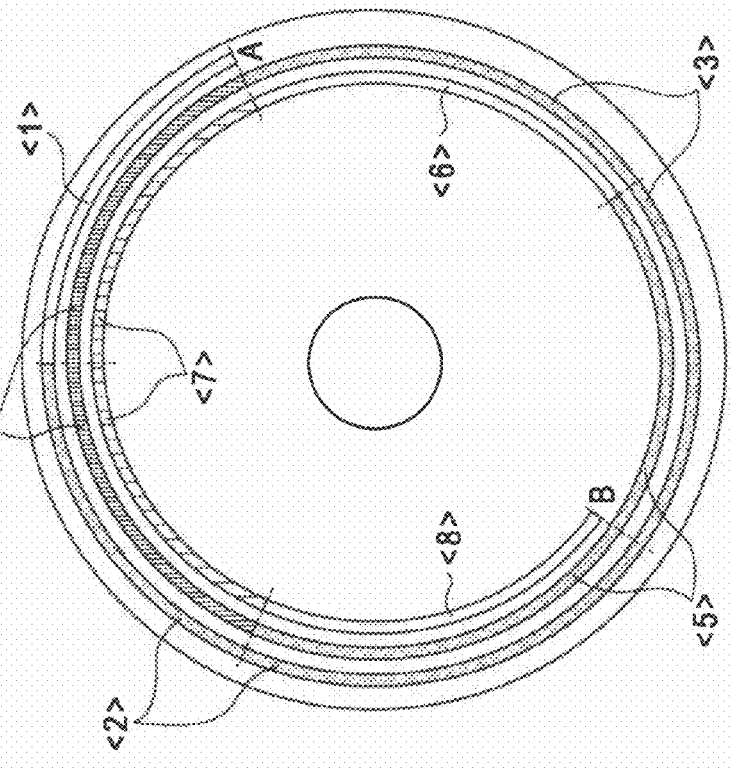

| 1 CLUSTER | 2 CLUSTERS | 3 CLUSTERS | 2 CLUSTERS | 1 CLUSTER | 2 CLUSTERS | 2 CLUSTERS | 2 CLUSTERS | 1 CLUSTER |
|---|---|---|---|---|---|---|---|---|
| REPRODUCTION PULL-IN RECORDING | CALCULATED STRATEGY TEST RECORDING | DUMMY RECORD FOR MAKING ANGLE SAME | COMPARED STRATEGY TEST RECORDING | REPRODUCTION PULL-IN RECORDING | STRATEGY CALCULATION RECORDING | STRATEGY CALCULATION RECORDING | STRATEGY CALCULATION RECORDING | RECORDING POWER ADJUSTMENT RECORDING |
| <8> | <7> | <D> | <6> | <5> | <4> | <3> | <2> | <1> |

FIG. 7B

| 1 CLUSTER | 2 CLUSTERS | 1 CLUSTER | 2 CLUSTERS | 2 CLUSTERS | 2 CLUSTERS | 2 CLUSTERS | 2 CLUSTERS | 1 CLUSTER |
|---|---|---|---|---|---|---|---|---|
| REPRODUCTION PULL-IN RECORDING | CALCULATED STRATEGY TEST RECORDING | REPRODUCTION PULL-IN RECORDING | STRATEGY CALCULATION RECORDING | COMPARED STRATEGY TEST RECORDING | STRATEGY CALCULATION RECORDING | STRATEGY CALCULATION RECORDING | STRATEGY CALCULATION RECORDING | RECORDING POWER ADJUSTMENT RECORDING |
| <8> | <7> | <6> | <5> | <4> | <3> | <2> | <2> | <1> |

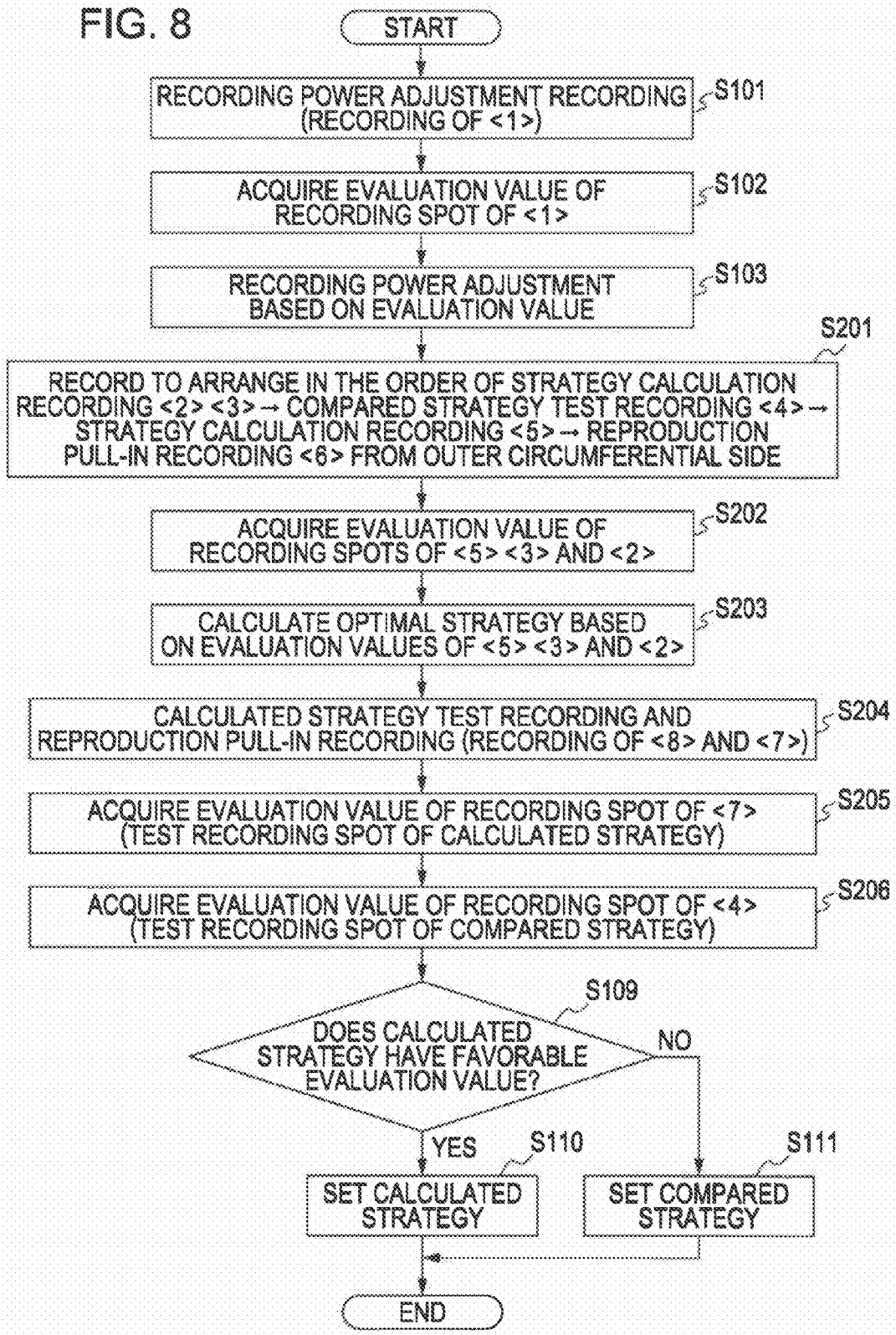

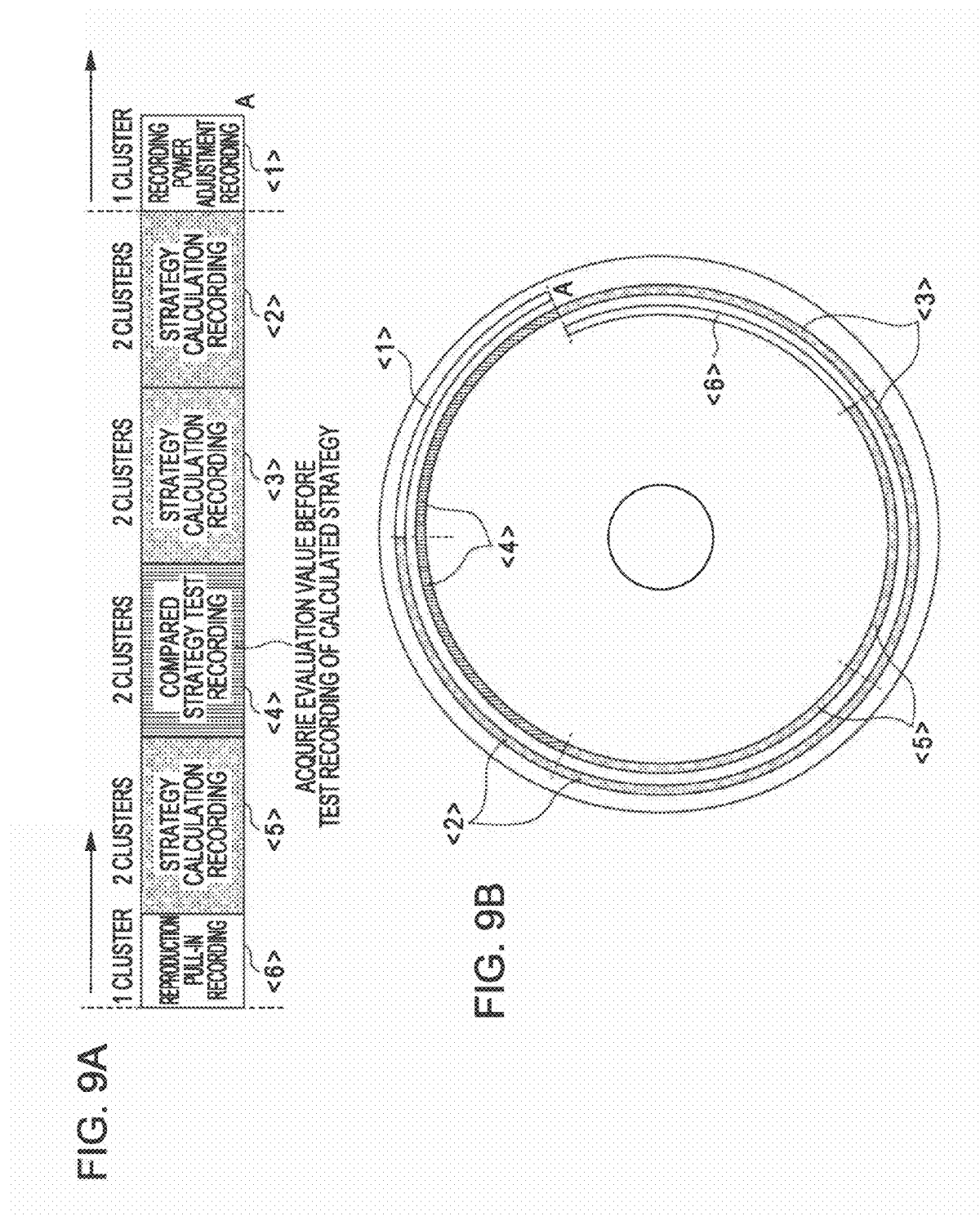

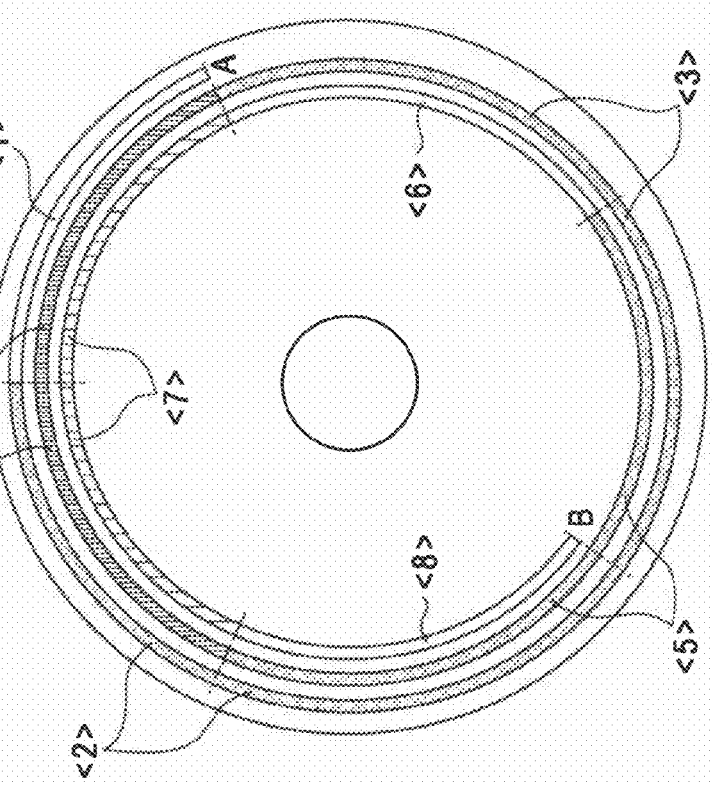

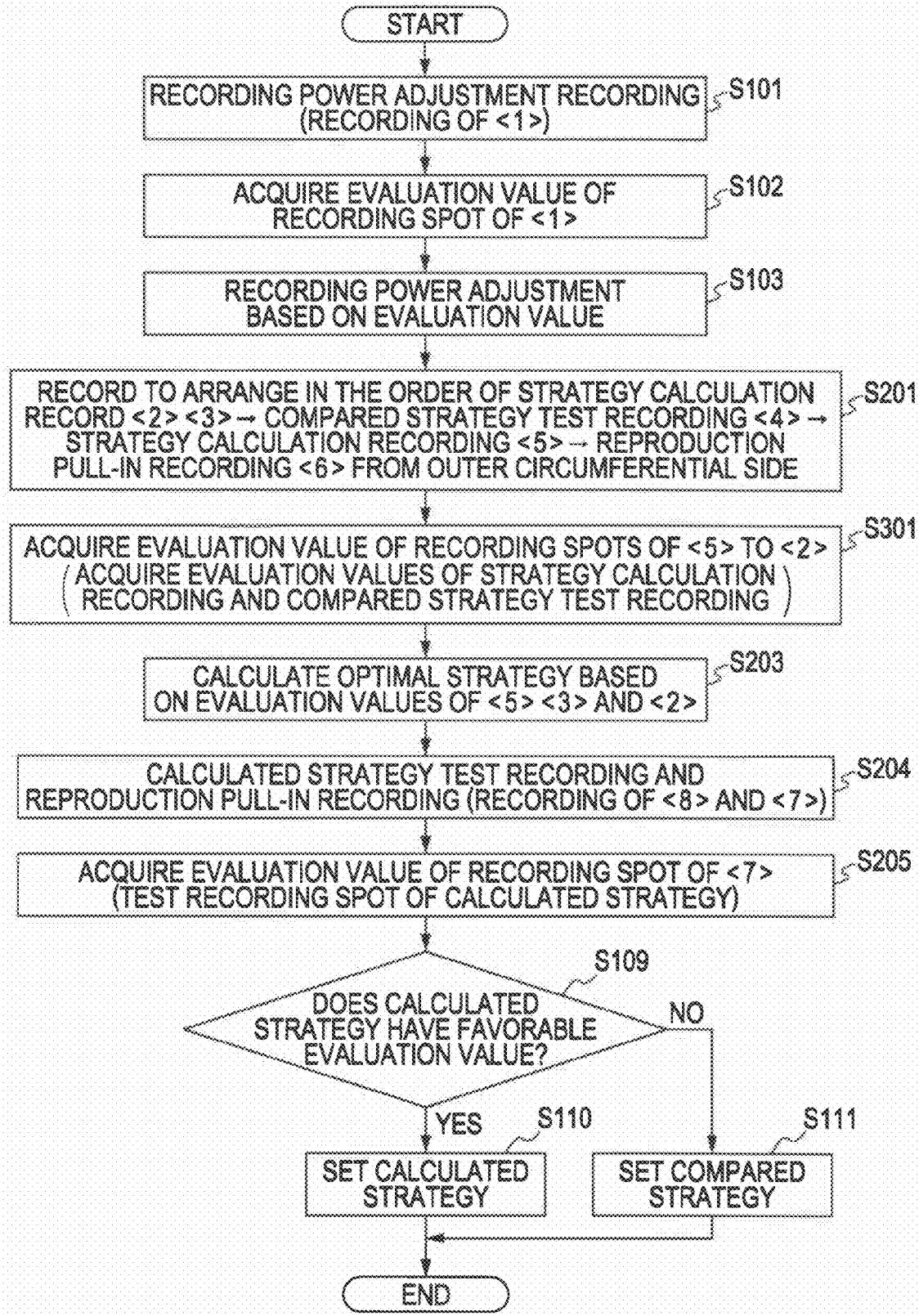

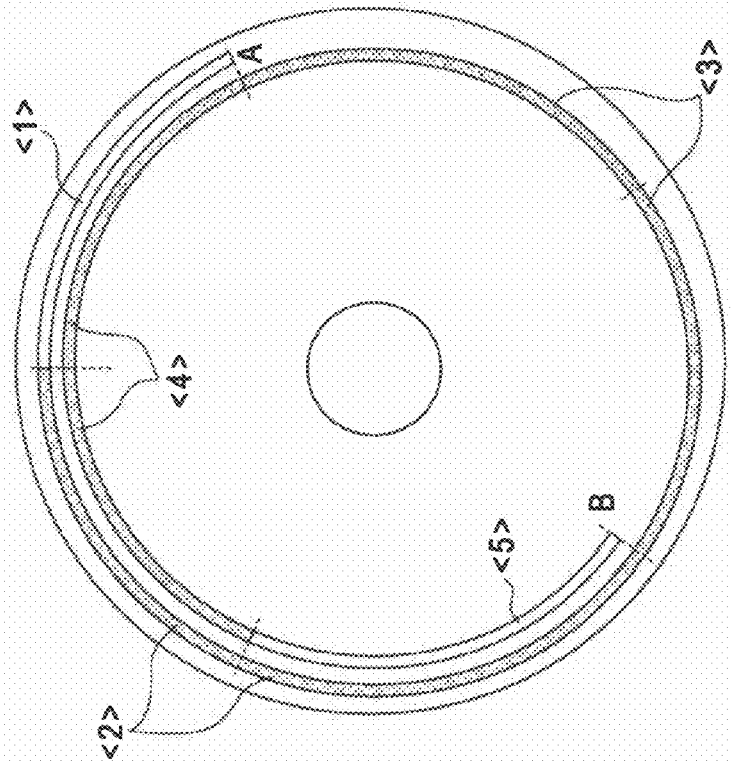

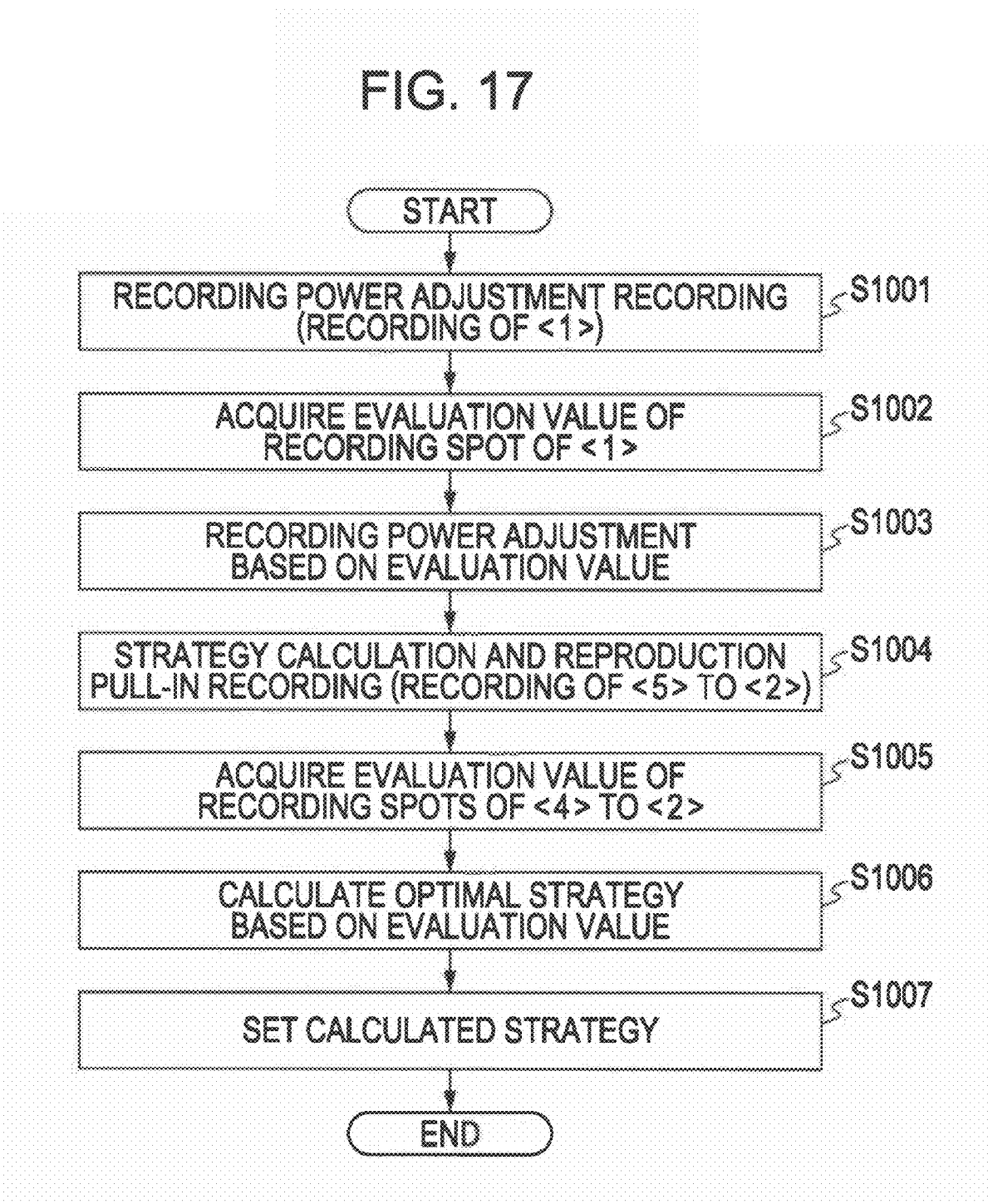

RECORDING/REPRODUCING DEVICE AND LASER DRIVING PULSE ADJUSTING METHOD

BACKGROUND OF THE INVENTION

1. Field of the Invention

The present invention relates to a recording/reproducing device and a laser driving pulse adjusting method for optical recording media, for example, recording optical discs.

2. Description of the Related Art

In the recording technology for optical discs, a recording parameter constituting a recording waveform formed by a laser is generally referred to as a write strategy, and a laser is driven to be emitted based on the write strategy so that information is recorded. In the recording of information on an optical disc, adjusting a parameter of the write strategy in order to attain high recording quality is called write strategy adjustment.

The write strategy adjustment is generally performed by making corrections to a reference strategy. The reference strategy is a basic write strategy, which is used as a predetermined reference, and a specific numerical value of the reference strategy can be set by a media manufacturer (recorded in advance on a medium) or stored in advance in a drive.

Here, generally, the write strategy adjustment can be performed for each optical disc to be loaded in a drive. That is, the write strategy is known to be closely related to the material and thickness of the recording film of an optical disc, the configuration of the grooves, and the like, and it is thus necessary that the write strategy be optimized for each optical disc to be used.

In addition, the write strategy adjustment is necessary for reducing variations in drives.

In this case, there are the following reasons that each of the drives performs the write strategy adjustment.

That is, in the market, many types of optical discs that are difficult to be handled by drive manufacturers are distributed, and so much research effort is necessary for preparing appropriate write strategies in advance for all optical discs distributed in the market. This is time-consuming and also raises the cost of drives. Additionally, measures such as firmware updates for drives are necessary in order to respond to media distributed after the drives are shipped, which is also time-consuming.

Due to the reasons described above, it is necessary that the write strategy adjustment is performed by drives during recording.

An example of a specific technique of the write strategy adjustment is disclosed in, for example, Japanese Unexamined Patent Application Publication No. 2000-200418.

Japanese Unexamined Patent Application Publication No. 2000-200418 described "Standard recording pulse conditions specifying recording pulse positions for plural possible mark length and space length combinations are read from a writable optical disk. These standard recording pulse conditions are used for test writing. The standard recording pulse conditions are changed uniformly or individually, and a best recording pulse condition is obtained, thereby reducing jitter".

Disclosed is the simplest technique that the write strategy is changed several times based on the reference strategy, and subjected to test writings. Then, signal quality evaluation values for the test writings are acquired, and a write strategy with the most excellent signal quality is used in actual recording.

By employing such a technique, variations of individual optical discs and drives are reduced, thereby adjusting to an optimized write strategy.

However, since the amount and orientation of variation of the optimized write strategy from the reference strategy vary depending on the combination of optical disc drives, in order to realize strategy adjustment with high accuracy in the technique disclosed in Japanese Unexamined Patent Application Publication No. 2000-200418, test writing is supposed to be performed which is assigned with adjustment values of the write strategy in a relatively extensive range. In other words, from this point, the technique disclosed in Japanese Unexamined Patent Application Publication No. 2000-200418 tends to have a large amount of test writing to be performed for the strategy adjustment, and there is a problem that a long adjustment time is necessary accordingly.

It is effective to use calculation by linear approximation to achieve reduction in the adjustment time, and for example, Japanese Unexamined Patent Application Publication Nos. 2008-84376 and 2007-521183 disclose an example of the specific technique.

Japanese Unexamined Patent Application Publication No. 2008-84376 discloses "When setting of two or more levels of power of laser light, a recording operation is performed for adjustment in an optical recording medium in different conditions of adjustment settings for a recording pulse, signals recorded by the recording operation are read to calculate a quality evaluation value, which is an index of recording signal quality, based on the setting conditions of the recording pulse. Thereby, quality evaluation values can be obtained for each of the setting conditions under each power setting, and an adjustment setting of the recording pulse is determined based on the quality evaluation values for each of the setting conditions of power. Accordingly, it is thus possible to determine the write strategy that can improve the total recording quality under the condition that a plurality of levels of recording power is set".

In addition, Japanese Unexamined Patent Application Publication No. 2007-521183 discloses "By using each of three recording pulse conditions, particular recording patterns are continuously recorded onto an optical disc for test and the recording patterns are continuously reproduced. An edge shift amount of a mark corresponding to each of the three recording pulse conditions is measured from each reproduction signal, and from the measured value, a correction value of the recording pulse condition is calculated by linear approximation".

In both of the techniques, test writing is performed for a plurality of write strategy and each of the signal evaluation values is obtained. Then, calculation is performed based on the result by using an arithmetic expression by a predetermined linear approximation, and the write strategy is adjusted.

Here, with reference to FIGS. 16A, 16B, and 17, a specific example of the flow of a series of adjustment processes including laser recording power adjustment when write strategy by such calculation is to be elicited will be explained.

FIGS. 16A and 16B show an example of the content (position) and arrangement order of each recoding on an optical disc in an adjustment operation, and FIG. 17 shows an example of the order of a process to be performed in order to realize an adjustment operation in such a case.

A writable optical disc medium, for example, Digital Versatile Disc (DVD)-R, DVD+R, DVD-RW, DVD+RW, Blu-ray Disc (BD: registered trademark)-R, or BD-RE, is provided with areas to be subjected to adjustment such as laser power or write strategy (adjustment area, test area) in innermost circumferential part and outermost circumferential part thereon. In the drawing, a case where adjustment using a test area in the outermost circumferential side is performed is exemplified.

In this case, each medium as described above is regulated such that the test area is used from the side of higher address numbers. A position A shown in FIG. 16A corresponds to a position A shown in FIG. 16B, and in the same manner, a position B shown in FIG. 16A corresponds to a position B shown in FIG. 16B.

In addition, in FIG. 16A, the arrow indicates a direction of writing and reading.

Moreover, on each medium as described above, a test area in the outermost circumferential part has about 5 clusters (a cluster is a unit of error correction) for one cycle.

In the example shown in FIGS. 16A, 16B, and 17, prior to an adjustment operation of the write strategy, adjustment operation of laser recording power, as so-called Optimum Power Control (OPC), is performed. Specifically, recording for recording power adjustment (Step S1001 in FIG. 17) as the recording power adjustment recording <1> shown in FIGS. 16A and 16B, acquisition of the evaluation value of the recording spot for <1> (S1002), and recording power adjustment based on the evaluation value (S1003) are performed.

As described above, since the case is regulated such that the test area is used from the side of higher address numbers, the recording power adjustment recording <1> is performed such that a cluster with the highest address number (a cluster in the outermost circumference in this case) within an unrecorded area is used in the test area. In this case, since the recording power adjustment recording <1> has a recording length of one cluster as shown in FIG. 16A, the recording power adjustment recording <1> is performed for the cluster with the highest address number.

Then, trial writing and acquisition of evaluation values are performed for strategy calculation. Specifically, as the strategy calculation and recording for reproduction pull-in (S1004), recording from reproduction pull-in recording <5> to strategy calculation recording <4> to <2> in FIGS. 16A and 16B is performed, and then, evaluation values of each recording spot of strategy calculation recording <4> to <2> are acquired (S1005).

Here, the reproduction pull-in recording <5> is a process for performing signal recording for a pull-in process necessary for reproducing data, such as pull-in of, Phase Locked Loop (PLL), Auto Gain Control (AGC), or the like. It is needless to say that the reproduction pull-in recording <5> is used as a pull-in area when the recording spots of the strategy calculation recording <4> to <2> are reproduced in the acquisition of evaluation values.

In addition, the strategy calculation recording <4> to <2> is a process for performing signal recording by changing each of the write strategies several times.

After the evaluation values are acquired for each of the strategy calculation recordings <4> to <2>, an optimized write strategy is calculated based on the evaluation values (S1006). In other words, an optimized write strategy is calculated based on a predetermined arithmetic expression (an arithmetic expression by linear approximation) and the evaluation values.

Then, a write strategy calculated as such is set (S1007).

SUMMARY OF THE INVENTION

The number of test writing and the adjustment time can be drastically reduced in comparison to the case where the technique disclosed in Japanese Unexamined Patent Application Publication No. 2000-200418 is used, by performing a strategy adjustment operation which uses an arithmetic expression by linear approximation as described above.

However, since the technique described above is based on a premise that there is a certain type of linearity between changes in write strategy and changes in quality evaluation value responding thereto, when the linearity is lost, it is surely not possible to perform accurate adjustment operation.

Specifically, as shown in FIGS. 16A, 16B, and 17, when it is assumed that test writing is performed for three types of write strategies and calculation is performed for adjustment, if a disturbance such as a defect occurs in a test writing area for one write strategy among them, the linearity, which is a premise of the adjustment calculation, is lost, and as a result, accurate adjustment operation is not possible.

Or, even when characteristics of a medium remarkably deteriorate, the linearity, which is a premise of the adjustment calculation, is not completed, and as a result, accurate adjustment operation is also not possible.

In the techniques in the related art disclosed in Japanese Unexamined Patent Application Publication Nos. 2008-84376 and 2007-521183, there are no measures taken for a case where the linearity is lost, and a calculated write strategy is used as it is in actual recording. In other words, from this point, in the related art where a write strategy is adjusted based on a predetermined arithmetic expression (an arithmetic expression by linear approximation), there is a concern that an incorrect write strategy arrangement value is set, and thereby, an accurate recording operation is not possible.

Therefore, an embodiment of the present invention has a configuration as a recording/reproducing device as described above taking the problems described above into consideration.

According to an embodiment of the present invention, a recording/reproducing device includes an optical head unit which performs writing and reading of information expressed by marks and spaces on an optical recording medium by irradiating laser light onto the optical recording medium, a laser driving pulse generating unit that generates a laser driving pulse according to the recorded information to supply a laser driving signal to the optical head unit, and executes the irradiation of the laser light onto the optical head unit for recording, an evaluation value calculating unit that calculates a quality evaluation value, which is an index of recording signal quality based on a signal read from the optical recording medium by the optical head unit, and an adjustment controlling unit that performs an adjustment setting of the laser driving pulse generated in the laser driving pulse generating unit and in the recording/reproducing device, with respect to waveform adjusting parameters for the laser driving pulse, after the adjustment controlling unit executes test writing for each waveform adjusting parameter by setting different waveform adjusting parameters in sequence, the unit calculates a waveform adjusting parameter for the improvement of signal quality based on a result from a reading of a signal for the test writing, and after the adjustment controlling unit executes test writing under a setting of each waveform adjusting parameter by setting a calculated waveform adjusting parameter calculated as such and a comparing target waveform adjusting parameter defined as a comparing object of the calculated waveform adjusting parameter in the laser driving pulse generating unit in sequence, the unit determines whether the signal quality has been improved further in a case where the calculated waveform adjusting parameter is set than in a case where the comparing target waveform adjusting parameter is set based on a result from the acquisition of a quality evaluation value for the signal for the test writing by the evaluation value calculating unit to perform an adjustment setting of the laser driving pulse based on the determination result.

According to the embodiment of the present invention, by using the comparing object waveform adjusting parameter which is decided to be a comparing object, test writing is performed in which the comparing object of the calculated waveform adjusting parameter and the calculated waveform adjusting parameter, which is calculated by test writing, are each set, and furthermore, it is determined whether the signal quality has been improved further in a case where the calculated waveform adjusting parameter is set than in a case where the comparing object waveform adjusting parameter is set, based on a result obtained from the acquisition of the quality evaluation values. In addition, based on the determination result, a waveform adjusting parameter is set.

According to the embodiment of the present invention, it is possible to determine whether the waveform adjusting parameter is correctly calculated or not, and based on the result, it is possible to prevent an incorrectly calculated waveform adjusting parameter from being set.

It is desirable for the embodiment of the present invention to determine whether a waveform adjusting parameter is correctly calculated or not, and based on the result, to prevent an incorrectly calculated waveform adjusting parameter from being set.

After all, as a result, the improvement in recording quality can be achieved.

In addition, according to the embodiment of the present invention, by relatively determining whether the waveform adjusting parameter is correctly calculated or not by using the comparing object waveform adjusting parameter, it is possible to clearly determine whether the waveform adjusting parameter is incorrectly calculated or not, for example, even when an object (a medium or a recording/reproducing device) from which favorable signal quality is not obtained is used. At the same time, for example, as a waveform adjusting parameter with favorable signal quality is set based on the determination result, a favorable waveform adjusting parameter can be assuredly set in the object.

BRIEF DESCRIPTION OF THE DRAWINGS

FIGS. 5A and 5B are diagrams describing a write strategy adjustment operation according to a second embodiment of the present invention;

FIGS. 7A and 7B are diagrams describing the reduction in a recording length necessary for an adjustment operation in the recording arrangement shown in FIGS. 5A and 5B;

FIG. 8 is a flowchart illustrating the order of a process to be performed for realizing an adjustment operation according to the second embodiment of the present invention;

FIGS. 9A and 9B are diagrams describing a write strategy adjustment operation (first half operation) according to a third embodiment of the present invention;

FIGS. 10A and 10B are diagrams describing a write strategy adjustment operation (second half operation) according to the third embodiment of the present invention;

FIG. 11 is a flowchart illustrating the order of a process to be performed for realizing an adjustment operation according to the third embodiment of the present invention;

FIGS. 16A and 16B are diagrams illustrating the content (position) and arrangement order of each recording performed in a write strategy adjustment operation in the related art; and FIG. 17 is a flowchart illustrating the order of a process to be performed for realizing a write strategy adjustment operation in the related art.

DESCRIPTION OF THE PREFERRED EMBODIMENTS

Hereinafter, exemplary embodiments of the present invention (hereinafter, referred to as embodiments) will be described in the following order.

1. First Embodiment
   1-1. Composition of Recording/Reproducing Device
   1-2. Adjustment Operation as First Embodiment
   1-3. Processing Order for realizing Adjustment Operation of First Embodiment
   2. Second Embodiment
   2-1. Adjustment Operation as Second Embodiment
   2-2. Processing Order for realizing Adjustment Operation of Second Embodiment
   3. Third Embodiment
   3-1. Adjustment Operation as Third Embodiment
   3-2. Processing Order for realizing Adjustment Operation of Third Embodiment
   4. Fourth Embodiment
   4-1. Adjustment Operation as Fourth Embodiment
   4-2. Processing Order for realizing Adjustment Operation of Fourth Embodiment
   5. Modified Example

1. First Embodiment

1-1. Composition of Recording/Reproducing Device

Figure 1:
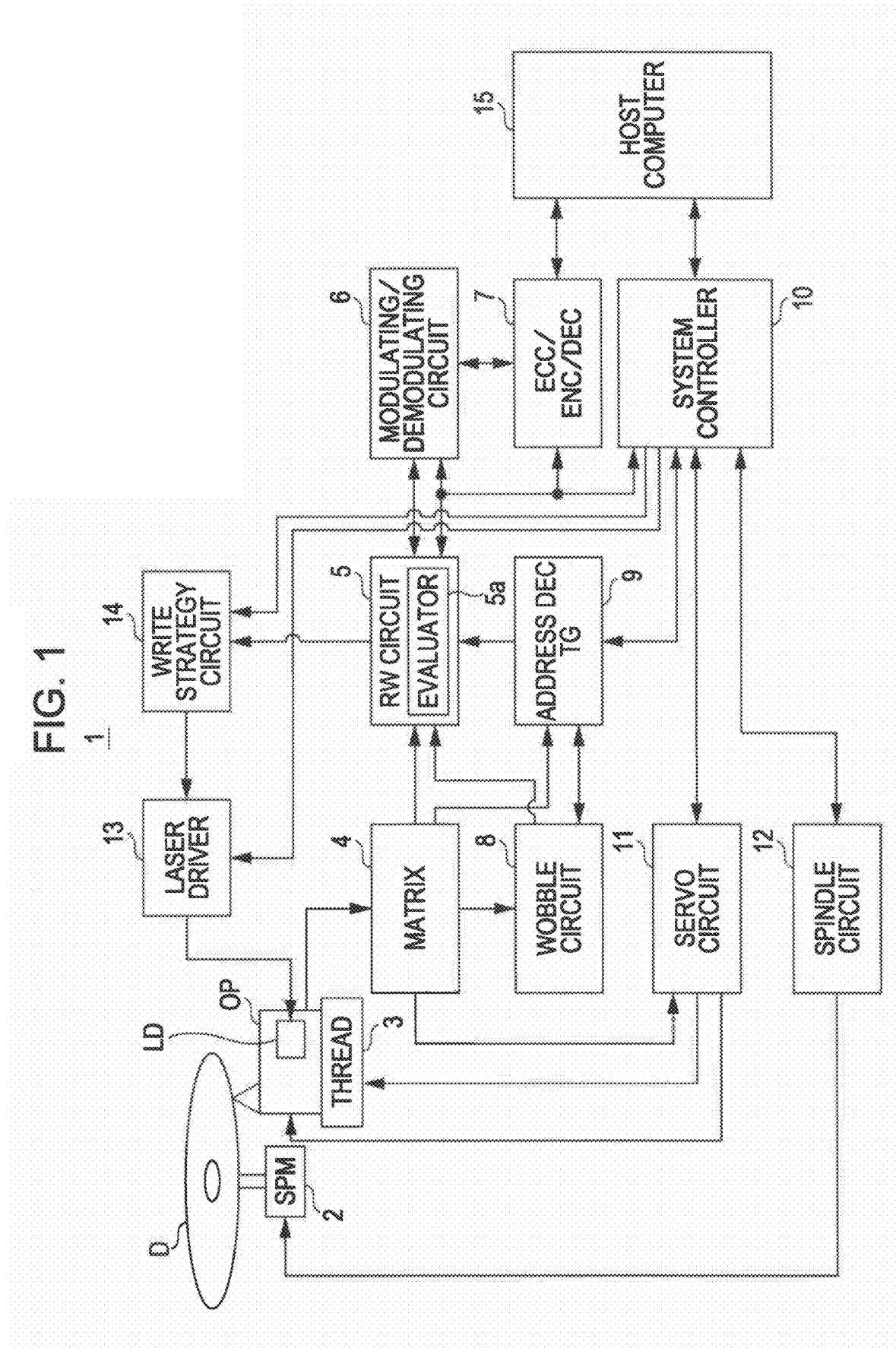
FIG. 1 is a block diagram illustrating the internal composition of a recording/reproducing device according to an embodiment of the present invention.

FIG. 1 is a block diagram illustrating the internal composition of a recording/reproducing device 1 according to an embodiment of a recording/reproducing device of the present invention.

In FIG. 1, a disc D is a disc-shaped optical recording medium. Here, an optical recording medium is a general term of recording media where recorded information is read by irradiating laser light. The disc-shape optical recording medium is also called an optical disc.

The recording/reproducing device 1 of the embodiment can handle optical discs (recordable and writable discs), of which one kind is the disc D above, on which recording of data is performed in a phase change system. In this case, grooves subjected to wobbling (meandering) are formed on the disc D, and the grooves are recording tracks. Address information, which is so-called ADIP information, and the like are embedded by the wobbling in the grooves.

In addition to such writable discs, the recording/reproducing device 1 of the embodiment can handle a so-called ROM-type (reproduction dedicated type) disc D on which information is recorded by a combination of pits/lands.

The recording/reproducing device 1 of the embodiment is configured to handle at least writable discs and ROM-type discs such as Digital Versatile Discs (DVD) and Blu-ray Discs (BD: registered trademark).

The disc D is loaded on a turntable which is not shown in the drawing, and driven to rotate in, for example, a fixed linear speed (CLV) by a spindle motor (SPM) 2 during a recording/reproducing operation.

In addition, reading of ADIP information embedded by wobbling of groove tracks on the disc D by optical pick-up (optical head) OP, reading of information recorded by phase change marks, or reading of information recorded by a combination of pits/lands is performed.

Furthermore, during recording, user data is recorded in tracks as phase change marks by the optical pick-up OP.

The optical pick-up OP is provided with a laser diode LD for performing laser light irradiation to the disc D.

The laser diode LD is driven to emit light based on laser driving signals (driving current) from a laser driver 13 shown in the drawing.

In addition, although not shown in the drawing, in the optical pick-up OP, a photodetector which detects reflective light resulting from laser light irradiation to the disc D by the laser diode LD, an object lens which is an output terminal of the laser light, an optical system (to be described later) which irradiates laser light on a disc recording face via the object lens and leads the reflective light to the photodetector are formed.

In the optical pick-up OP, the object lens is held so as to move by a biaxial mechanism in a tracking direction and focus direction.

In addition, the entire optical pick-up OP can move in a direction parallel to a disc radius direction by a thread mechanism 3 in the drawing.

Reflective light information from the disc D detected by the photodetector in the optical pick-up OP is supplied to a matrix circuit 4 as an electric signal according to the amount of received light.

The matrix circuit 4 is provided with a current-voltage converting circuit in response to output current from a plurality of light-sensing devices as the photodetector, a matrix calculating/amplifying circuit, and the like, and necessary signals are generated by a matrix calculating process.

For example, the matrix circuit 4 generates high frequency signals corresponding to reproduction data (also referred to as reproduction data signals or RF signals), focus error signals for servo control, tracking error signals, and the like.

The matrix circuit 4 further generates signals relating to wobbling of the grooves, that is, push-pull signals as signals for detecting wobbling (wobble amplitude).

The reproduction data signals output from the matrix circuit 4 are supplied to a reader/writer (RW) circuit 5, the focus error signals and the tracking error signals to a servo circuit 11, and the push-pull signals to a wobble circuit 8, respectively.

The reader/writer circuit 5 performs generation of a reproduced clock or the like by a binarization process and Phase Locked Loop (PLL) process for the reproduced data signals (RF signals). The binarized data by the reader/writer circuit 5 are supplied to a modulating/demodulating circuit 6.

The reader/writer circuit 5 also performs generation of recording signals in recording by a process to be described later.

In addition, the reader/writer circuit 5 is provided with an evaluator 5a therein. The evaluator 5a measures (calculates) a quality evaluation value which is an evaluation index for reproduction signal quality based on the RF signals. In case of a specific example, the evaluator 5a calculates a jitter value as the quality evaluation value.

The quality evaluation value calculated by the evaluator 5a is supplied to a system controller 10.

The modulating/demodulating circuit 6 is provided with a section functioning as a decoder during reproduction and a section functioning as an encoder during recording.

As a decoding process during reproduction, a demodulation process of a run length limited code is performed based on the reproduction clock.

In addition, an ECC encoder/decoder 7 performs an ECC encoding process to add an error correction code during recording and an ECC decoding process to correct an error during reproduction.

During reproduction, data demodulated in the modulating/demodulating circuit 6 are taken into an internal memory to perform a process such as error detection/correction or deinterleaving and thereby obtaining reproduced data.

The data decoded to be the reproduced data in the ECC encoder/decoder 7 are read based on the instruction of the system controller 10, and transferred to a host computer 15.

Push-pull signal output from the matrix circuit 4 as signals relating to wobbling of the grooves is processed in the wobble circuit 8. Push-pull signal as ADIP information is demodulated into a data stream constituting the ADIP address in the wobble circuit 8 and supplied to an address decoder 9.

The address decoder 9 obtains an address value by performing decoding for the supplied data and supplies the data to the system controller 10.

In addition, the address decoder 9 generates a clock in the PLL process using the wobble signals supplied from the wobble circuit 8, and supplies the clock to each part as an encode clock, for example, during recording.

In recording, record data is transferred from the host computer 15, but the record data is delivered to memory (not shown in the drawing) in the ECC encoder/decoder 7 for buffering.

In this case, the ECC encoder/decoder 7 performs addition of error correction codes, sub-codes, interleaving, or the like as an encoding process for the buffered record data.

In addition, the data subjected to ECC encoding is subjected to a predetermined run length limited encoding process (modulating process), for example, in RLL (1-7) PP mode in the modulating/demodulating circuit 6, and supplied to the reader/writer circuit 5.

As the encode clock which is a reference clock for such an encoding process during recording, a clock generated from the wobble signal described above is used.

The record data generated in the encoding process is subjected to a predetermined record modulation encoding or D/A converting process in the reader/writer circuit 5, and then supplied to a write strategy circuit 14 as recording signals.

The write strategy circuit 14 generates a laser driving pulse according to the recording signals supplied from the reader/writer circuit 5. The pulse level or pulse edge position of the laser driving pulse generated in the write strategy circuit 14 is adjusted by a set value from the system controller 10 (write strategy set value).

During recording, the laser driving pulse generated in the write strategy circuit 14 and subjected to strategy adjustment is given as a driving signal of the laser diode LD via the laser driver 13.

In addition, during recording, calibration is performed for recording power by an Optimum Power Control (OPC) process, and optimized recording power acquired by the OPC is set for the laser driver 13.

Since the OPC process is performed based on a controlling process by the system controller 10, the system controller 10 sets a value of the recording power acquired from the execution of the OPC process for the laser driver 13. Accordingly, recording operation can be performed by the optimized recording power.

The servo circuit 11 generates various types of servo drive signals such as focus, tracking, and thread from the focus error signals and tracking error signals from the matrix circuit 4 described above to execute servo operation.

In other words, focus drive signals and tracking drive signals are generated according to the focus error signals and tracking error signals, and a focus coil and a tracking coil, which are biaxial mechanisms, in the optical pick-up OP are driven. Thereby, a tracking-servo loop and a focus-servo loop are formed by the optical pick-up OP (photodetector), the matrix circuit 4, servo circuit 11, and the biaxial mechanisms.

In addition, the servo circuit 11 turns off the tracking servo loop according to track jump command from the system controller 10, and executes track jump operation by outputting jump drive signals.

Furthermore, the servo circuit 11 generates thread error signals obtained as a low-pass component of tracking error signals or thread drive signals based on access execution control from the system controller 10, and drives a thread mechanism 3. The thread mechanism 3 is provided with a mechanism constituted by a main shaft supporting the optical pick-up OP, a thread motor, a transmission gear and the like, and the thread motor is driven according to the thread drive signals to perform sliding movement necessary for the optical pick-up OP.

A spindle servo circuit 12 controls a spindle motor 2 to perform CLV rotation.

The spindle servo circuit 12 obtains the clock generated in the PLL process for wobble signals as rotation speed information of the current spindle motor 2 when the disc D is a writable disc, and generates spindle error signals by comparing the information with predetermined CLV reference speed information.

In data reproduction, since the reproduced clock generated by the PLL process of the reader/writer circuit 5 (clock as a standard of decoding process) becomes rotation speed information of the current spindle motor 2, spindle error signals are generated by comparing the information with predetermined CLV reference speed information.

Then, the spindle servo circuit 12 outputs spindle drive signals generated according to the spindle error signals, and causes the spindle motor 2 to perform CLV rotation.

In addition, the spindle servo circuit 12 causes the occurrence of the spindle drive signals according to spindle kick/brake controlling signals from the system controller 10, and also causes operations of the spindle motor 2 such as start-up, stop, acceleration, and deceleration.

Each kind of operation of the servo system and recording/reproducing system as above is controlled by the system controller 10 formed in a microcomputer.

The system controller 10 performs various processes according to commands from the host computer 15. For example, when a writing command is issued from the host computer 15, the system controller 10 moves the optical pick-up OP to an address in which data is to be written. Then, the ECC encoder/decoder 7 performs the encoding process as described above for data (for example, video data or audio data in various forms of MPEG2 and the like) transferred from the host computer 15 by the modulating/demodulating circuit 6. Then, recording signals are supplied to the laser driver 13 from the reader/writer circuit 5 according to the process, thereby performing recording on the disc D.

In addition, when a reading command that demands transfer of certain data (for example, MPEG 2 video data) recorded on the disc D is supplied from, for example, the host computer 15, seek operation control is performed targeting the instructed address. In other words, a command is issued to the servo circuit 11, and then access operation of the optical pick-up OP is executed targeting the instructed address.

After that, operation control is performed which is necessary for transferring data in the instructed data zone to the host computer 15. In other words, data reading from the disc D is performed, decoding, buffering, or the like is executed in the reader/writer circuit 5, the modulating/demodulating circuit 6, and the ECC encoder/decoder 7, and the requested data is transferred.

In addition, in the case of this example, the system controller 10 causes test writing under different write strategy set conditions by giving different write strategy set values to the write strategy circuit 14, calculates a write strategy (optimized write strategy) for signal quality improvement based on the result of obtaining the quality evaluation value supplied from the evaluator 5a according to reading of a spot where the test writing is performed.

Furthermore, write strategy adjustment operation will be described again as the embodiment that includes such calculation of a write strategy.

Here, in the example of FIG. 1, with an assumption that a composition of AV equipment, for example, a personal computer or a video recorder incorporated with a disc drive unit, a configuration is exemplified where the system controller 10 provided in the disc drive unit executes various processes according to instruction of the host computer 15 (which performs general control for the recording/reproducing device 1) provided in the main body of a device. However, the present invention is not limited to the configuration provided with the host computer 15 and the system controller 10, and can employ a configuration appropriately optimized according to actual embodiment.

1-2. Adjustment Operation as First Embodiment

First, prior to the description on the write strategy adjustment operation as the present embodiment, premises in this example will be explained.

First, in the example, test writing for the write strategy adjustment is performed in a test area (adjustment area) determined in advance on the disc D. In the example, as described above, the disc D is equivalent to writable discs such as DVD or BD (DVD-R, DVD+R, DVD-RW, DVD+RW or BD-R, BD-RE), such media including the disc D are provided with a test area in the outermost circumferential part and the innermost circumferential part.

Here, in the first embodiment to the third embodiment, cases where test writing for the write strategy adjustment is performed in a test area provided in the outermost circumferential part are exemplified.

In addition, in such cases, within the test area, the disc D is regulated by format so that signal recording is performed from the side of higher address numbers (outer circumferential side in this case).

Furthermore, in this example, the write strategy adjustment operation is performed as a series of operations in accordance with optimized recording power adjustment operation as OPC.

Furthermore, in this example, recording on the disc D is performed by a cluster as a minimum unit. Here, the cluster is a unit of error correction (equivalent to one ECC block).

Furthermore, in this example, calculation of the write strategy is performed based on the arithmetic expression by linear approximation based on the result of acquiring evaluation values of recording spots obtained by performing test writing under different conditions for setting write strategies, in the same manner as, for example, the inventions disclosed in Japanese Unexamined Patent Application Publication Nos. 2008-84376 and 2007-521183.

Furthermore, to describe for confirmation, the present invention does not have characteristics of the calculating technique of write strategy itself for improving signal quality, but the calculation of write strategy may be performed according to a predetermined arithmetic expression. In other words, the present invention is not limited to the techniques disclosed in Japanese Unexamined Patent Application Publication Nos. 2008-84376 and 2007-521183.

Furthermore, in this example, when write strategy is calculated for improving signal quality, test writing is performed for three kinds of conditions for setting write strategies. In other words, test writing for the write strategy calculation in this case is performed under a write strategy setting by a first setting condition, under a write strategy setting by a second setting condition, and under a write strategy setting by a third setting condition.

Figure 2:
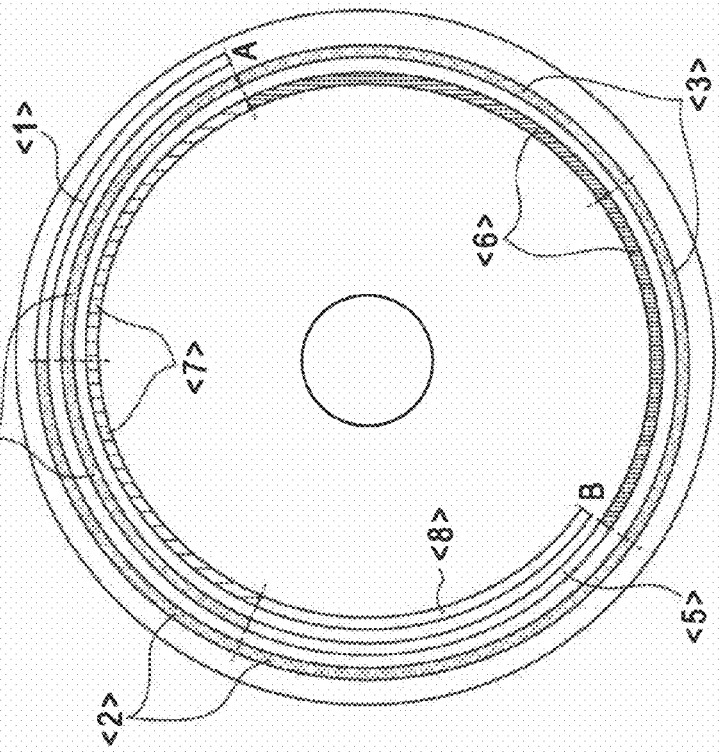
FIGS. 2A and 2B are diagrams describing a write strategy adjustment operation according to a first embodiment of the present invention.

In addition, test writing in this case is performed for two clusters for one write strategy setting condition (for example, refer to FIG. 2A).

Based on the premise as above, the write strategy adjustment operation will be described as the first embodiment with reference to FIGS. 2A and 2B.

FIGS. 2A and 2B show each recording and the arrangement order thereof when the write strategy adjustment operation as the present embodiment (and an OPC process) is performed. FIG. 2A mainly shows different content of each recording, and recording lengths and the arrangement order thereof, and FIG. 2B shows positions and the arrangement order of each recording in FIG. 2A on the disc D.

Here, a position A shown in FIG. 2A corresponds to a position A shown in FIG. 2B, and in the same manner, a position B shown in FIG. 2A corresponds to a position B shown in FIG. 2B.

In addition, in FIG. 2A, the arrows indicate writing and reading directions.

First, as described above, test writing for adjustment operation is performed in the test area provided in the outermost circumferential part on the disc D in the present embodiment.

Here, in each aforementioned medium, the length of one circle of a track in the test area provided in the outermost circumferential part is equivalent to the length of about five clusters.

As understood by comparing FIGS. 2A and 2B and FIGS. 16A and 16B explained above, in an adjustment operation of the present embodiment, the adjustment operation of optimized recording power and calculation of the write strategy for improving signal quality are performed in the same manner as the case in the related art.

Specifically, also in this case, recording power adjustment recording (which is <1> in the drawings and amounts to one cluster) is first performed for a cluster with the highest address number in a non-recorded area within the test area, and a quality evaluation value of the recording spot by the recording power adjustment recording <1> is acquired. Then, based on the result, an optimized recording power (elicitation and setting of an optimized recording power based on an evaluation value) is adjusted.

After that, strategy calculation recording (<2> to <4>) and reproduction pull-in recording (<5>) in the drawings are performed for the calculation of the write strategy.

Here, the reproduction pull-in record is signal recording for performing a pull-in process necessary for data reproduction, such as pull-in of PLL or Auto Gain Control (AGC), in the same manner as described in FIGS. 16A and 16B above.

In this example, the recording length of the reproduction pull-in recording becomes equivalent to one cluster as shown in FIGS. 2A and 2B.

To described for confirmation, since the reading and writing direction in this case is the direction of the arrows shown in the drawings (from the inner circumference side to the outer circumference side), when recording content of the strategy calculation recording <2> to <4> and the reproduction pull-in recording <5> is to be obtained, each recording is performed so as to be arranged in the order of "reproduction pull-in recording <5>→strategy calculation recording <4> (record under the first write strategy setting condition) →strategy calculation recording <3> (record under the second write strategy setting condition)→strategy calculation recording <2> (record under the third write strategy setting condition)" along the writing and reading direction.

At this time, to keep the rule of pushing into the side of higher address numbers, the address where the recording is started is obtained by calculating inversely from information of, for example, the final address of the non-recorded area in the test area (in this case, the address prior to the address where the recording power adjustment recording <1> is performed) and information of the signal length to be recorded (in this case, signal length of the reproduction pull-in recording <5>→strategy calculation recording <4> to <2>).

Then, after performing the reproduction pull-in recording <5> and strategy calculation recording <4> to <2>, reading of each recording spot of the strategy calculation recording <4> to <2> is executed, and accordingly, the quality evaluation value is acquired in the evaluator 5a.

After that, based on the quality evaluation value acquired as above, write strategy is calculated for improving signal quality according to the arithmetic expression by linear approximation.

The write strategy calculated according to the arithmetic expression by linear approximation as above is referred to as a "calculated strategy" hereinbelow.

In the present embodiment, without immediately setting the calculated strategy obtained as above to the write strategy circuit 14 according thereto, as in the drawings, after performing compared strategy test recording (<6>) and calculated strategy test recording (<7>), it is determined whether the signal quality has been improved by the setting of the calculated strategy.

Here, in this example, as the compared strategy, a so-called reference strategy (initial strategy) is used.

As described above, the reference strategy is a basic write strategy used as a reference determined in advance, and as a specific set value, there are set values which are determined by media manufacturers (recorded on the disc D) and stored in advance in a drive (the recording/reproducing device 1).

The reference strategy can be obtained from a result of an experiment of combining, for example, the disc D, which is a reference, and the recording/reproducing device 1 (optical pick-up OP).

In FIGS. 2A and 2B, as a specific operation after obtaining the calculated strategy, first, reproduction pull-in recording <8>→calculated strategy test recording <7>→compared strategy test recording <6> are performed along the direction of the arrows in the drawings.

Also in this case, the reproduction pull-in recording is one cluster. In addition, test recording for both of the calculated strategy and the compared strategy are two clusters.

Also in this case, a recording operation is started after obtaining by inverse calculation of a recording-started address so that the recording is performed and pushed in the side of higher address numbers.

Furthermore, after performing the reproduction pull-in recording <8>→calculated strategy test recording <7>→compared strategy test recording <6>, quality evaluation values are acquired by executing reading of recording spots of the calculated strategy test recording <7> and compared strategy test recording <6>.

Then, based on the magnitude relationship of the acquired quality evaluation values, it is determined whether the signal quality has been improved further in the case where the calculated strategy is set than in the case where the compared strategy is set. Specifically, it is determined whether a numeric value of the quality evaluation value acquired in the recording spot of the calculated strategy test recording <7> is better than that of the quality evaluation value acquired in the recording spot of the compared strategy test recording <6>. For example, when the quality evaluation values are jitter values as in this example, it is determined whether the quality evaluation value acquired in the recording spot of the calculated strategy test recording <7> is smaller than the quality evaluation value acquired in the recording spot of the compared strategy test recording <6>.

As a result of the determination as above, when the signal quality has been improved further in the case where the calculated strategy is set than in the case where the compared strategy is set, elicitation of the calculated strategy is deemed to be performed correctly, and the calculated strategy is employed as a write strategy to be used in actual recording. Specifically, a write strategy set value as the calculated strategy is set in the write strategy circuit 14.

On the other hand, as a result of the determination above, when the signal quality has not been improved further in the case where the calculated strategy is set than in the case where the compared strategy is set, elicitation of the calculated strategy can be deemed not to be performed correctly.

For that reason, in the present embodiment, when the signal quality has not been improved further in the case where the calculated strategy is set than in the case where the compared strategy is set, the compared strategy is employed as a write strategy to be used in actual recording. Specifically, a write strategy set value as the compared strategy is set in the write strategy circuit 14.

As such in the present embodiment, by using the reference strategy as the compared strategy, based on test writing where the compared strategy is set and a calculated strategy obtained by calculating the result from test writing, it is determined whether the signal quality has been improved further in the case where the calculated strategy is set than in the case where the compared strategy is set. Then, based on the determination result, setting of waveform adjustment parameters is performed.

According to the write strategy adjustment operation as the present embodiment above, it is possible to determine whether the calculated strategy has been correctly calculated, and based on the result, it is possible to prevent an incorrectly calculated strategy from being set.

Finally, as a result, improvement in recording quality can be achieved.

Here, when it comes to determining whether the write strategy has been correctly calculated or not, it is thought that the determination also can be performed such that test writing where the calculated strategy is set and acquisition of a quality evaluation value are performed, and it is determined whether the acquired evaluation value is equal to or more than a threshold value, which is set in advance. In other words, that the quality more than a pre-determined signal quality can be obtained is a technological notion that is determined as a correctly calculated write strategy, which can be adopted.

However, when the technique of determining an absolute threshold value for a quality evaluation value as such is employed, it is good for objects (disc D and recording/reproducing device 1) having favorable characteristics in signal quality, but in the case of objects having unfavorable characteristics, even though the calculation of a write strategy itself is normally performed, it may occur that quality that satisfies the threshold value is not able to be obtained. In other words, in this case, even though the calculated strategy that has higher signal quality than the compared strategy has effectiveness, the evaluation value is less than the threshold value, and thereby, the compared strategy, which has lower signal quality, may be employed.

To deal with the matter, according to the technique of the present embodiment, since it is relatively determined whether the calculated strategy is better than the compared strategy, it is possible to prevent the compared strategy from being employed, which results from unfavorable characteristics of the objects as above, even though the calculated strategy is actually better.

In other words, as understood from the point, according to the present embodiment, there is an advantage that a better strategy can assuredly be set for the objects based on the relative determination result as above.

1-3. Processing Order for Realizing Adjustment Operation of First Embodiment FIG. 3 is a flowchart illustrating the order of a process to be performed for realizing an adjustment operation according to the first embodiment described above.

Figure 3:
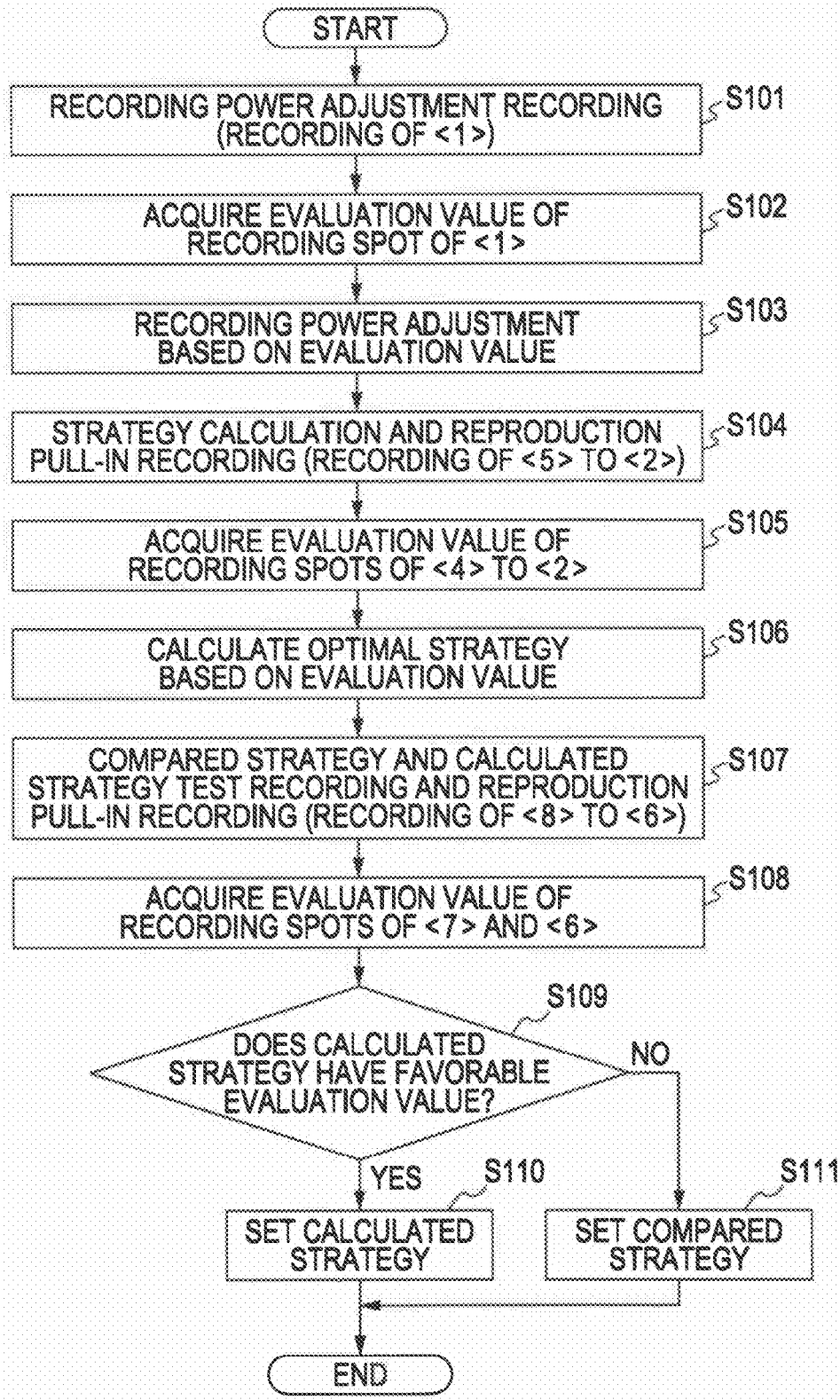
FIG. 3 is a flowchart illustrating the order of a process to be performed for realizing adjustment operation according to the first embodiment of the present invention.

FIG. 3 shows the order of a specific process for realizing an adjustment operation as the first embodiment with a premise that the system controller 10 shown in FIG. 1 performs operation based on a program accommodated in, for example, internal memory.

In addition, starting from FIG. 3, FIGS. 7A and 7B, FIG. 11, FIG. 14, and FIG. 15 are assumed to be in a state where reading of the compared strategy from the disc D has been completed when the compared strategy is recorded on the disc D.

In FIG. 3, the process from Steps S101 to S106 is the same as the process Steps S1001 to S1006 which has been described in FIGS. 16A and 16B.

To describe for confirmation, first, the process from Steps S101 to S103 is a process for adjusting optimized recording power as the OPC process.

Specifically, in Step S101, a process is executed for performing recording power adjustment recording (recording of <1> in FIGS. 2A and 2B). In other words, the servo circuit 11, reader/writer circuit 5, the modulating/demodulating circuit 6, the ECC encoder/decoder 7 are controlled to execute data recording, and the recording power adjustment recording is executed by changing the recording power to be set to the laser driver 13 several times.

As understood from the description above, the recording power adjustment recording <1> is performed by using a cluster in the side of the highest address number in the non-recorded area within the test area.

Subsequently, in Step S102, as a process for acquiring the evaluation value of the recording spot of <1>, data reading is performed for the spot where recording is performed in Step S101 after the servo circuit 11 is controlled, and accordingly, the quality evaluation value obtained in the evaluator 5a is acquired.

Then, in the next Step S103, as a process of adjusting the recording power based on the evaluation value, the optimized recording power is elicited based on the quality evaluation value acquired in Step S102 and the elicited recording power is set to the laser driver 13.

Subsequently, the process of Steps S104 to S106 is for strategy calculation.

In other words, first in Step S104, a process is performed for performing recording of strategy calculation and reproduction pull-in (recording from <5> to <2>). As described before, such recording is performed in the arrangement order of "reproduction pull-in recording <5>→strategy calculation recording <4>→strategy calculation recording <3>→strategy calculation recording <2>" along the writing and reading direction.

Specifically, in Step S104, for the reproduction pull-in recording <5>, the servo circuit 11, the reader/writer circuit 5, the modulating/demodulating circuit 6, and the ECC encoder/decoder 7 are controlled to execute a predetermined data recording. In addition, for the strategy calculation recording <4> to <2>, recording of test data, which is determined in advance, is executed, and the write strategy set value of the write strategy circuit 14 is changed several times (in this case, change in every two clusters).

Subsequently in Step S105, as a process for acquiring the evaluation values of the recording spots of <4> to <2>, reading is performed for the recording spots of the strategy calculation recording <4> to <2> by controlling the servo circuit 11, and accordingly, the quality evaluation values obtained in the evaluator 5a are acquired.

Furthermore, in the next Step S106, the optimized strategy is calculated based on the evaluation values. In other words, based on the quality evaluation values acquired in Step S105 above, the optimized write strategy is calculated for improving the signal quality according to the arithmetic expression set in advance.

After the calculated strategy is obtained in the calculation process of Step S106 as above, in Step S107, a process is executed for performing test recording of the compared strategy and calculated strategy, and the reproduction pull-in recording (recording from <8> to <6>).

As described above in FIGS. 2A and 2B, such recording is performed so that the arrangement order is "reproduction pull-in recording <8>→calculated strategy test recording <7>→compared strategy test recording <6>" along the reading and writing direction. In Step S106, for the reproduction pull-in recording <8>, the servo circuit 11, the reader/writer circuit 5, the modulating/demodulating circuit 6, and the ECC encoder/decoder 7 are controlled to execute a predetermined data recording. In addition, for the calculated strategy test recording <7> to the compared strategy test recording <6>, recording of test data, which is determined in advance, is performed, and the setting state of the write strategy set value of the write strategy circuit 14 is changed from the setting state of the calculated strategy to the setting state of the compared strategy (for two clusters each).

Subsequently, in Step S108, as a process for acquiring evaluation values of the recording spots of <7> and <6>, recording is performed for the recording spots of the calculated strategy test recording <7> and the compared strategy test recording <6> by controlling the servo circuit 11, and accordingly, the quality evaluation values obtained in the evaluator 5a are acquired.

In addition, in the next Step S109, it is determined whether the evaluation value of the calculated strategy is good or not. In other words, it is determined whether the quality evaluation value for the calculated strategy test recording <7> acquired in Step S108 has more favorable value than the quality evaluation value for the compared strategy test recording <6> acquired in Step S108 in the same way.

When the quality evaluation value is a jitter value as in this example, the determination process of Step S109 is a process for determining whether the quality evaluation value for the calculated strategy test recording <7> is smaller than the quality evaluation value for the compared strategy test recording <6>.

In Step S109, when a positive result that the calculated strategy has a favorable evaluation value is obtained, the process advances to Step S110, and the calculated strategy is set. In other words, the write strategy set value calculated in the calculation process of Step S106 is set for the write strategy circuit 14.

On the other hand, in Step S109, when a negative result that the calculated strategy has an unfavorable evaluation value is obtained, the process advances to Step S111, and the compared strategy is set. In other words, the write strategy set value as a reference strategy, which is stored in the recording/reproducing device 1 in advance or recorded on the disc D in advance, is set for the write strategy circuit 14.

After executing Steps S110 or S111, the process for adjustment operation shown in the drawing ends.

2. Second Embodiment

2-1. Adjustment Operation as Second Embodiment

Next, the second embodiment will be described.

In the second embodiment, the position where the calculated strategy is recorded and the position where the compared strategy is recorded are arranged at the same angular position on the disc D.

Furthermore, starting from the second embodiment, in the third and fourth embodiments to be described below, the composition of the recording/reproducing device 1 is the same as that in the first embodiment, and therefore, description for the part with reference to drawings will not be repeated.

Figure 4:
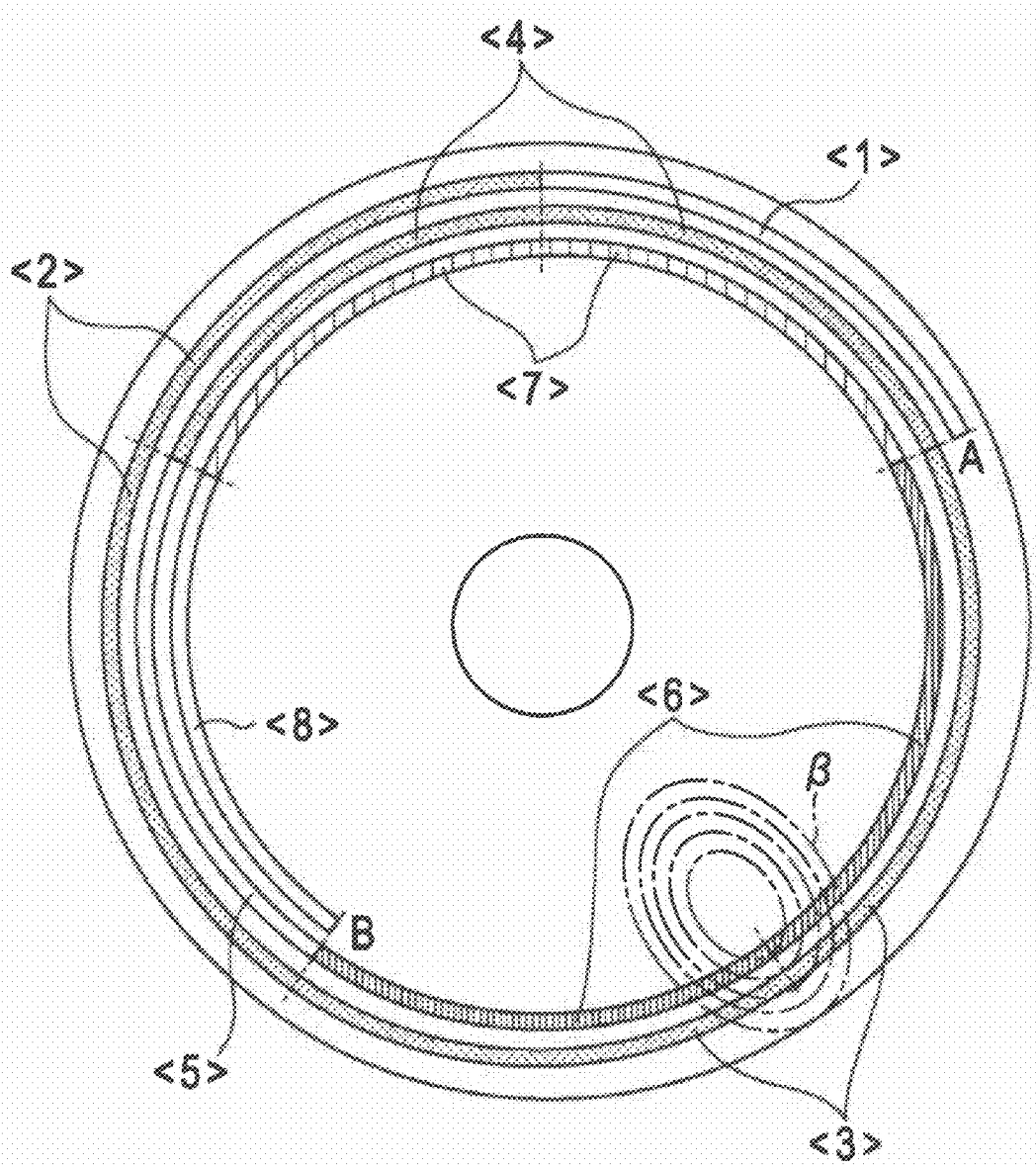
FIG. 4 is a diagram illustrating a positional relationship of each recording on a disc when the recording is performed for adjustment operation by a technique of the first embodiment of the present invention.

FIG. 4 shows a positional relationship on the disc D for recording when the recording is executed for an adjustment operation by the technique described in the first embodiment.

Here, when the recording is performed for the adjustment operation in the order described in the first embodiment, the position where the compared strategy test recording <6> is performed and the position where the calculated strategy test recording <7> is performed are arranged adjacent to each other in the circumferential direction.

Accordingly, when disturbance (β) by imprint of a fingerprint or the like occurs in the position shown in the drawing, the evaluation value in the compared strategy test recording <6> tends to deteriorate, and as a result, there is a concern that the evaluation value of the calculated strategy test recording <7> is determined to be favorable even though the calculation of the calculated strategy has not been correctly performed. In addition, the opposite circumstance thereto may occur.

As understood from the above point, when each recording is performed for adjustment operation in the order as described in the first embodiment, there is a case where disturbance occurs in a spot of test recording for any one of the calculated strategy and the compared strategy, and accordingly, there is a concern whether the calculated strategy has been correctly calculated or not is not able to be properly determined. As a result, there is a problem that an improper write strategy is set, which may cause deterioration in recording quality.

Therefore, in the second embodiment, the position where the test recording is performed for the calculated strategy and the position where the test recording is performed for the compared strategy are arranged at the same angular position on the disc D, and it is aimed to prevent occurrence of the influence by the disturbance only on one recording position as shown in FIG. 4.

FIGS. 5A and 5B are diagrams for describing write strategy adjustment operation according to the second embodiment and show the positions and arrangement order of each recording executed when the same adjustment operation is performed as in the case of FIGS. 2A and 2B. In this case, in the same manner as in FIGS. 2A and 2B, FIG. 5A shows different content of each recording, and recording lengths and the arrangement order thereof, and FIG. 5B shows positions and the arrangement order of each recording in FIG. 5A on the disc D.

As understood by comparing FIGS. 5A and 5B and FIGS. 2A and 2B, the different point from the first embodiment is that the position where test recording is performed for the compared strategy is arranged at the position deviated as far as three clusters to the outer circumferential side.

Specifically, in the adjustment operation of the case, after performing the optimized recording power adjustment operation by the OPC process after performing the recording power adjustment recording <1> in the same manner as in the first embodiment, each recording is performed so as to be arranged in the order of "strategy calculation recording <2>→strategy calculation recording <3>→compared strategy test recording <4>→strategy calculation recording <5>→reproduction pull-in recording <6>" from the outer circumferential side as shown in the drawings. That is, each recording is performed so as to be arranged in the order of "reproduction pull-in recording <6>→strategy calculation recording <5>→compared strategy test recording <4>→strategy calculation recording <3>→strategy calculation recording <2>" along the writing and reading direction.

This is understood that the compared strategy test recording <4> as test writing under the compared strategy setting condition is inserted between the strategy calculation recording <5> as test writing under the first strategy setting condition and the strategy calculation recording <3> as test writing under the second strategy setting condition.

In addition, in this case, after recording is performed in the order of "reproduction pull-in recording <6>→strategy calculation recording <5>→compared strategy test recording <4>→strategy calculation recording <3>→strategy calculation recording <2>" along the writing and reading direction as above, reading of each recording spot of the strategy calculation recording <5>, the strategy calculation recording <3>, and the strategy calculation recording <2> are executed, the quality evaluation values for each of the recording spots are acquired, and then, the write strategy is calculated based on the acquired quality evaluation values and a predetermined arithmetic expression.

Furthermore, after obtaining the calculated strategy by such a calculation process, each recording is performed in the order of "reproduction pull-in recording <8>→calculated strategy test recording <7>" along the writing and reading direction.

After that, reading is performed for the recording spot of the calculated strategy test recording <7> and the recording spot of the compared strategy test recording <4>, and the quality evaluation values for each are acquired. Based on the magnitude relationship of the acquired quality evaluation values, it is determined whether the signal quality has been improved further in the case where the calculated strategy is set in the same manner as in the first embodiment than in the case where the compared strategy is set, and based on the determination result, the write strategy is set.

In the second embodiment, by performing each recording with the arrangement order and the recording length as described above, a gap as far as three clusters is formed between the calculated strategy test recording and the compared strategy test recording.

Here in this example, one cycle of a track in the test area is equivalent to about five clusters. Also in this example, each test recording of the calculated strategy and the compared strategy is performed for two clusters.

Accordingly, by forming the gap of three clusters between each test recording of the calculated strategy and the compared strategy as above, the position where each test recording of the calculated strategy and the compared strategy is performed can be arranged at the same angular position as on the disc D.

Figure 6:
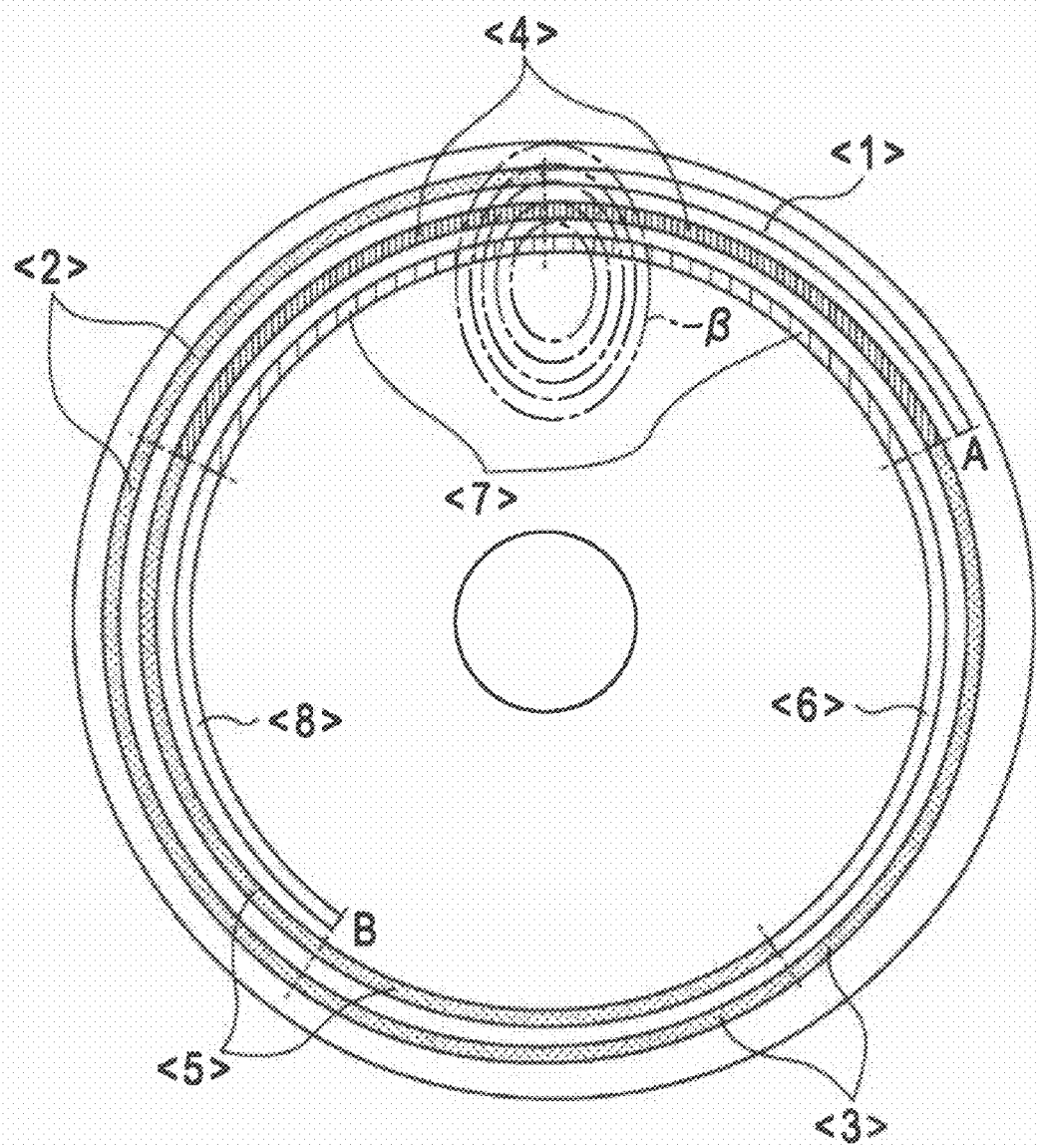
FIG. 6 is a diagram illustrating a positional relationship of each recording on a disc when the recording is performed for an adjustment operation by a technique of the second embodiment of the present invention.

FIG. 6 shows a positional relationship on the disc D for each recording when the recording is executed for adjustment operation by the technique according to the second embodiment as described above.

As obvious from FIG. 6, if each test recording position of the calculated strategy and the compared strategy is made to be arranged at the same angular position, it is possible to effectively prevent the influence of the disturbance (β) only on one of the test recording positions from occurring.

Here, generally, since the disturbance such as a defect occurs in a considerably wide range (for example, from dozens to several hundred tracks) for a track width of the disc D (for example, 0.32 μm in case of a BD), it is possible to regard that the influence by the disturbance is equally received on each recording position arranged at the same angular position as above.

Therefore, according to the second embodiment, it is possible to effectively prevent a situation where whether the calculation of the calculated strategy has been correctly performed is erroneously determined by the influence of the disturbance, and as a result, a more proper write strategy adjustment operation can be performed.

In addition, by performing each recoding following the arrangement shown in FIGS. 5A and 5B, when each test recording position of the calculated strategy and the compared strategy is arranged at the same angular position, it is possible to suppress the entire recording lengths necessary for the adjustment operation.

Here, if it is simply the objective to make angles of each test recording position of the calculated strategy and the compared strategy be the same, for example as shown in FIG. 7A, a technique can be employed in which dummy recording of three clusters (<D> in the drawing) is performed for making angles be the same between the compared strategy test recording <6> and the calculated strategy test recording <7> in the recording arrangement of FIGS. 2A and 2B as described in the first embodiment.

FIG. 7B shows the recording arrangement as shown in FIGS. 5A and 5B, as comparison, but as obvious from the comparison between FIG. 7A and FIG. 7B, if the recording arrangement shown in FIGS. 5A and 5B is adopted, it can be understood that the recording length necessary for the adjustment operation is actually reduced in comparison to a case where the technique for simply making the angles be the same is employed.

As such, by reducing the recording length (three clusters in this case) necessary for the adjustment operation, effective use of the test area can be attained in a way that far more adjustment operations are possible within a limited test area.

2-2. Processing Order for Realizing Adjustment Operation of Second Embodiment

FIG. 8 is a flowchart illustrating the order of a process to be performed for realizing the adjustment operation according to the second embodiment of the present invention.

In FIG. 8 also, the process for realizing the adjustment operation is that the system controller 10 shown in FIG. 1 executes an operation based on the program accommodated in, for example, an internal memory.

In addition, in FIG. 8, in a process with the same content that has been described in the first embodiment, the same step numbers are given, and description thereof will be not be repeated.

As understood by comparing FIG. 8 and FIG. 3, in the second embodiment, instead of the process of Steps S104 to S108 for the first embodiment, the process of Steps S201 to S206 is performed.

Specifically, in this case, after executing the recording power adjustment process of Step S103, in Step S201, a process is executed for performing each recording so as to be arranged in the order of "strategy calculation recording <2> <3>→compared strategy test recording <4>→strategy calculation recording <5>→reproduction pull-in recording <6>" from the outer circumferential side.

Specifically, the servo circuit 11, the reader/writer circuit 5, the modulating/demodulating circuit 6, and the ECC encoder/decoder 7 are controlled and the write strategy set value for the write strategy circuit 14 is set several times so that each recording is performed in the order of "reproduction pull-in recording <6>→strategy calculation recording <5>→compared strategy test recording <4>→strategy calculation recording <3> <2>" along the reading and writing direction.

Furthermore, it is needless to say that recording in the test area in this case is also performed and pushed to higher address numbers. That is, also in this case, the system controller 10 performs calculation of the recording start address so that the above rule is to be observed during each recording.

Subsequently, in Step S202, a process for acquiring evaluation values of recording spots of <5>, <3>, and <2> is performed.

In other words, the servo circuit 11 is controlled, reading or each recording spot of strategy calculation recording <5>, strategy calculation recording <3>, and strategy calculation recording <2> is performed, and accordingly, quality evaluation values obtained in the evaluator 5a are acquired.

Then, in the next Step S203, an optimized strategy is calculated based on the quality evaluation values of <5>, <3>, and <2> acquired in Step S202.

After the calculated strategy is obtained by the calculation process of Step S203, in the next Step S204, a process is executed for performing calculated strategy test recording and reproduction pull-in recording (recording of <8> and <7>).

In other words, the servo circuit 11, the reader/writer circuit 5, the modulating/demodulating circuit 6, the ECC encoder/decoder 7 are controlled and write strategy is set for the write strategy circuit 14 so that each recording is performed in the order of "reproduction pull-in recording <8>→calculated strategy test recording <7>" along the writing and reading direction.

Subsequently, in Step S205, a process is executed to acquire the evaluation value of the recording spot of <7> (test recording spot of the calculated strategy).

In the next Step S206, a process is executed to acquire the evaluation value of the recording spot of <4> (test recording spot of the compared strategy).

After acquiring the quality evaluation values of each recording spot of the calculated strategy and the compared strategy as above, a process in which whether the calculated strategy has a favorable evaluation value or not is determined in the same manner as in the first embodiment (Step S109) and a process of setting write strategy based on the determination result (Step S110 or 5111) are executed.

Here, the second embodiment aims to propose a technique for excluding the influence from disturbance, and detailed content thereof is not limited to the description provided above. For example, the detailed process content is supposed to be modified according to cases where the recording length of each recording operation changes from the example above, and where the strategy calculation recording is performed under three or more setting conditions.

When the influence by disturbance is to be excluded, each test recording may be performed so that the test recording spot of the compared strategy and the test recording spot of the calculated strategy are arranged at the same angular position on the disc D.

3. Third Embodiment 3-1. Adjustment Operation as Third Embodiment

Next, the third embodiment will be described.

The third embodiment intends to organize conditions of recording/non-recording in adjacent tracks during acquisition of quality evaluation values for each of the test recording spots of the calculated strategy and the compared strategy.

Here, when the quality evaluation value is a jitter value as in this example, or is a standard deviation of differential metrics, which is an evaluation value of a Partial Response Most Likelihood (PRML) system, PRSNR, or the like, there are differences occurring in acquired evaluation values according to various conditions of recording/non-recording in adjacent tracks.

To describe for confirmation, the conditions of recording/non-recording in adjacent tracks mentioned above are specifically, with a track, which is an object of measuring an evaluation value, as a standard, conditions classified into one in which both tracks adjacent to the standard track have been subjected to recording, one in which both tracks adjacent to the standard track have been subjected to non-recording, or one in which only one of the tracks has been subjected to recording.

FIGS. 9A, 9B, 10A, and 10B are diagrams for describing the adjustment operation according to the third embodiment.

In FIGS. 9A, 9B, 10A, recording operation performed during the adjustment operation as the third embodiment is divided into a first half operation and a second half operation. FIGS. 9A and 9B show each recording performed as the first half operation and FIGS. 10A and 10B show each recording performed as the first half operation and as the second half operation.

Furthermore, in FIGS. 9A, 9B, 10A, FIGS. 9A and 10A mainly show different content of each recording, and recording lengths and the arrangement order thereof, and FIGS. 9B and 10B show positions and the arrangement order of each recording in FIGS. 9A and 10A on the disc D, in the same manner as in cases of FIGS. 2A, 2B, 5A, and 5B.

First, as the first half operation shown in FIGS. 9A and 9B, operation up to the acquisition of the calculated strategy, which is substantially the same as those in the second embodiment, is performed.

In other words, also in this case, after the adjustment operation of an optimized recording power is performed based on the result from recording power adjustment recording <1>, each recording is performed so as to be arranged in the order of "strategy calculation recording <2> <3>→compared strategy test recording <4>→strategy calculation recording <5>→reproduction pull-in recording <6>" from the outer circumferential side as shown in the drawings. Then, the write strategy is calculated based on the result from the acquisition of quality evaluation values of recording spots of the strategy calculation recording <2>, <3>, and <5>.

However, in the third embodiment, after recording is performed for the strategy calculation recording <2> <3>→compared strategy test recording <4>→strategy calculation recording <5>→reproduction pull-in recording <6>, the quality evaluation values are not acquired only for the recording spots of the strategy calculation recording <2>, <3>, and <5> different from the case in the second embodiment. The quality evaluation value is also acquired for the recording spot of the compared strategy test recording <4> in parallel. In other words, the acquisition of the quality evaluation values for test recording of the compared strategy is performed in advance before performing test recording of the calculated strategy.

Here, as obvious from FIG. 9B, since the acquisition of evaluation values for a test recording spot (<4>) of the compared strategy is performed at the timing described above, the acquisition of evaluation values for the test recording spot of the compared strategy is performed under the condition that only one adjacent track (adjacent to outer side) has been subjected to recording.

As such, after the evaluation values of the strategy calculation recording <2>, <3>, and <5> and the compared strategy test recording <4> are acquired as the first half operation and the write strategy is calculated based on evaluation values of the strategy calculation recording <2>, <3>, and <5>, as the second half operation shown in FIGS. 10A and 10B, each recording is performed so as to be arranged in the order of "calculated strategy test recording <7>→reproduction pull-in recording <8>" from the outer circumferential side, and quality evaluation value for the recording spot of the calculated strategy test recording <7> is acquired.

At this time, as understood from FIG. 10B, the acquisition of evaluation value of the test recording spot (<7>) of the calculated strategy is performed under the condition that only one adjacent track (which is adjacent to the outer side) of the test recording spot of the calculated strategy has been subjected to recording.

In the third embodiment also, in response to the state where the quality evaluation value is acquired for the recording spot of the calculated strategy test recording <7> and the quality evaluation values are acquired for both test recording spots of the compared strategy and the calculated strategy, in the same manner as the cases of the embodiments hitherto, it is determined whether the signal quality has been improved further in the case where the calculated strategy is set than in the case where the compared strategy is set based on the magnitude relationship of the acquired quality evaluation values, and the write strategy is set based on the determination result.

As described above, in the third embodiment, test recording is performed for the compared strategy before test recording is performed for the calculated strategy. In addition, the length of a portion puts the test recording spot of the compared strategy together with the recording spot (<5> and <6> in this case) positioned between the test recording spot of the compared strategy and the test recording spot of the calculated strategy is not supposed to exceed a length of one cycle of a track (five clusters in this case).

After satisfying the condition above, by acquiring the evaluation value of the test recording spot of the compared strategy before the test recording of the calculated strategy as above, conditions of recording/non-recording of adjacent tracks during the acquisition of evaluation values for both test recording spots can coincide with the condition "only one of the adjacent tracks has been subjected to recording". As a result, it is possible not to generate a difference resulting from discrepancy in the conditions of recording/non-recording in the evaluation values acquired in each test recording spot, and accordingly, it is possible to rightly determine whether the calculated strategy has been correctly calculated or not.

In addition, as understood by comparing FIGS. 10A and 10B and FIGS. 5A and 5B, in the third embodiment, the arrangement of each recording itself is the same as the case of the second embodiment. That is, as understood from this point, it is possible to exclude the influence of disturbance also in the third embodiment, in the same manner as the second embodiment.

At the same time, in order to exclude the influence of disturbance also in the third embodiment as in the second embodiment, it is possible to suppress the entire recording lengths necessary for the adjustment operation.

Here, the technique shown in FIGS. 9A, 9B, 10A, and 10B is just an example of showing a technique for coinciding the conditions of recording/non-recording of adjacent tracks with each other during the acquisition of the evaluation values of each test recording spot, and for example, recording length or arrangement order of each recording performed in the adjustment operation can be appropriately modified according to an actual embodiment, in addition to whether both of the adjacent tracks have been subjected to recording (or non-recording), or only one of the adjacent tracks has been subjected to recording.

As the third embodiment, test recording and quality evaluation values may be acquired so that the conditions of recording/non-recording of the adjacent tracks coincide with each other during the acquisition of the quality evaluation values of each of the test recording spots for the compared strategy and the calculated strategy.

3-2. Processing Order for Realizing Adjustment Operation of Third Embodiment FIG. 11 is a flowchart illustrating the order of the process for realizing adjustment operation according to the third embodiment. In FIG. 11, as an example of the adjustment operation according to the third embodiment, the order of the process for realizing the adjustment operation shown in FIGS. 9A, 9B, 10A, and 10B will be described.

In FIG. 11 also, the process for realizing the adjustment operation is executed by the system controller 10 shown in FIG. 1 based on the program accommodated in, for example, an internal memory.

In addition, in FIG. 11, processes that have the same content are given with the same step numbers as those which have been described in the embodiments hitherto, and description thereof will not be repeated.

As understood by comparing FIG. 11 and FIG. 8, Step S202 changes to Step S301, and Step S206 is omitted in the process order of the third embodiment, which are different points in comparison to the process order of the second embodiment.

Specifically in this case, in Step S201, after a process is executed for performing each recording so as to be arranged in the order of "strategy calculation recording <2> <3>→compared strategy test recording <4>→strategy calculation recording <5>→reproduction pull-in recording <6>" from the outer circumferential side, in Step S301, a process is executed for acquiring evaluation values of recording spots for <5> to <2> (acquisition of evaluation value of strategy calculation recording and compared strategy test recording).

In other words, the servo circuit 11 is controlled to execute reading of the recording spots from the strategy calculation recording <5> to strategy calculation recording <2>, and accordingly, the quality evaluation values obtained in the evaluator 5a are acquired.

As such, since the evaluation value is acquired for the compared strategy test recording <4> in Step S301, the process of Step S206 (the acquisition of the evaluation value for the test recording spot of the compared strategy) described in FIG. 8 is omitted in this example.

4. Fourth Embodiment

4-1. Adjustment Operation as Fourth Embodiment

The fourth embodiment proposes a specific technique for attaining the exclusion of the influence of disturbance and coincidence of conditions for recording/non-recording of adjacent tracks as in the third embodiment based on the premise that the test area in the inner circumferential side is used.

Figures 12A, 12B:
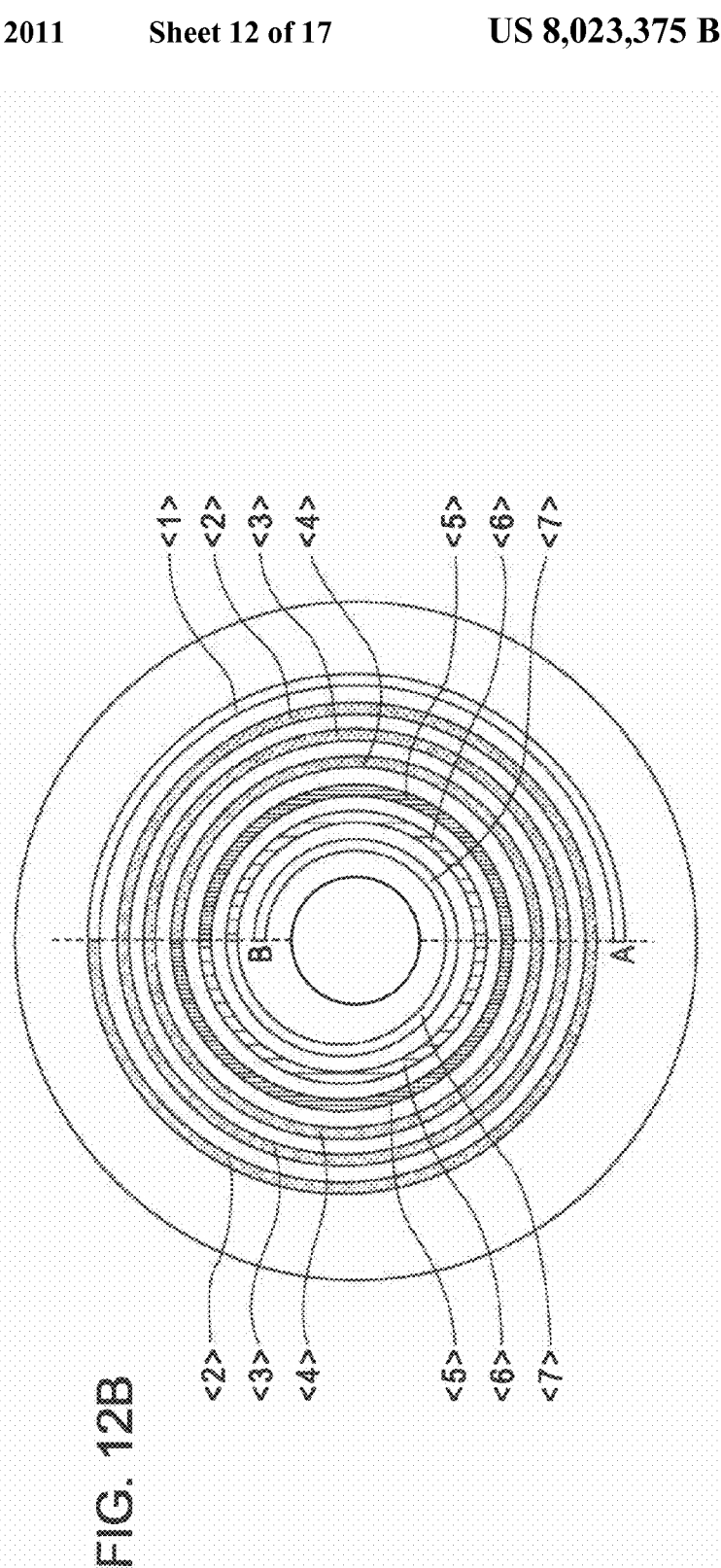
FIGS. 12A and 12B are diagrams describing a write strategy adjustment operation according to a fourth embodiment of the present invention.

FIGS. 12A and 12B are diagrams illustrating adjustment operation of the fourth embodiment, and show the positions and arrangement order of each recording executed when the adjustment operation is performed as FIGS. 2A, 2B, 5A, and 5B. In this case, in the same manner as the cases in FIGS. 2A, 2B, 5A, and 5B, FIG. 12A mainly shows different content of each recording, and recording lengths and the arrangement order thereof, and FIG. 12B shows positions and the arrangement order of each recording in FIG. 12A on the disc D.

To describe for confirmation, it is the same that recording is performed and pushed to higher address numbers also in the test in the inner circumferential side.

In addition, one circle of a track is two clusters in the test in the inner circumferential side.

In FIGS. 12A and 12B, for the adjustment operation in this case, first, the recording power adjustment recording <1> is performed, and the adjustment operation of an optimized recording power is performed by the OPC process.

Accordingly, in this case, after the adjustment operation of the optimized recording power is performed, each recording is performed so as to be arranged in the order of "strategy calculation recording <2>→strategy calculation recording <3>→strategy calculation recording <4>→compared strategy test recording <5>" from the outer circumferential side as shown in the drawings (in other words, to be arranged in the order of "compared strategy test recording <5>→strategy calculation recording <4>→strategy calculation recording <3>→strategy calculation recording <2>" along the writing and reading direction).

In this case, after each recording above is performed, by using the compared strategy test recording <5> as a recording spot for reproduction pull-in, evaluation values of the strategy calculation recording <2> to <4> are acquired. Then, the write strategy is calculated based on the evaluation values of the acquired strategy calculation recording <2> to <4>.

After the calculation of the write strategy, each recording is performed so as to be arranged in the order of "calculated strategy test recording <6>→reproduction pull-in recording <7>" from the outer circumferential side (in other words, to be arranged in the order of "reproduction pull-in recording <7>→calculated strategy test recording <6>" along the writing and reading direction). Thereafter, reading of the calculated strategy test recording <6> and reading of the compared strategy test recording <5> are performed, and quality evaluation values for each test recording spot are acquired. Then, based on the acquired quality evaluation values, it is determined whether the signal quality has been improved further in the case where the calculated strategy is set than in the case where the compared strategy is set as in the first embodiment, and the write strategy is set based on the determination result.

In the adjustment operation as the fourth embodiment described above, the test recording spot of the compared strategy (two clusters also in this case) and the test recording spot of the calculated strategy (two clusters likewise) are adjacent to each other in the circumferential direction.

Figure 13:
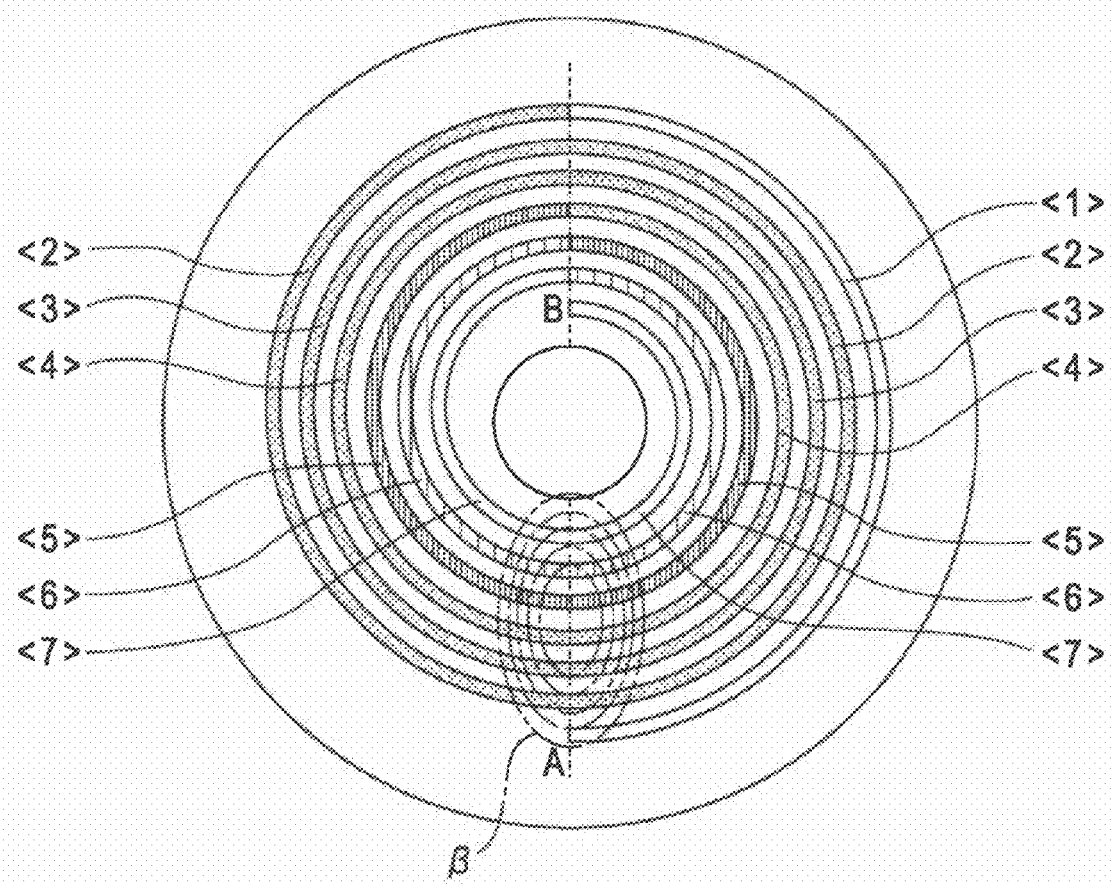
FIG. 13 is a diagram illustrating a positional relationship of each recording on a disc when the recording is performed for adjustment operation by a technique of the fourth embodiment of the present invention.

With this configuration, for the test area in the inner circumferential side where one cycle of a track is two clusters, the test recording spots of the compared strategy and the calculated strategy are arranged to be at the same angular position in this case. In other words, it is aimed to prevent only one of the test recording areas from receiving the influence of disturbance (refer to FIG. 13).

Furthermore, in the fourth embodiment, a recorded area equivalent to two or more clusters is formed adjacent to the outer circumferential side of the test recording spot of the compared strategy, and a recorded area equivalent to two or more clusters is formed adjacent to the inner circumferential side of the test recording spot of the calculated strategy. In addition, after such recording states are obtained, the quality evaluation values are obtained for each of the test recording spots of the compared strategy and the calculated strategy.

With this configuration, for each of the test recording spots of the compared strategy and the calculated strategy, the conditions for recording/non-recording of the adjacent tracks during the acquisition of the quality evaluation values can coincide with the condition "both of the adjacent tracks have been subjected to recording". As a result, it is possible to rightly determine whether the calculated strategy has been correctly calculated.

Here, the technique described in FIGS. 12A and 12B, is just an example to realize the exclusion of the influence of disturbance in the test area in the inner circumferential side, and the coincidence of the conditions for recording/non-recording of the adjacent tracks, and the technique for realizing the exclusion of the influence of disturbance and the coincidence of the conditions for recording/non-recording of the adjacent tracks is not supposed to be limited to the technique above.

In this case also, when the influence of disturbance is to be excluded, each test recording may be performed so that the test recording spots of the calculated strategy and the compared strategy are arranged to be at the same angular position on the disc D.

In addition, when the conditions for recording/non-recording are to coincide with each other, each test recording and the acquisition of the quality evaluation values may be performed so that the conditions for recording/non-recording of the adjacent tracks coincide with each other during the acquisition of the quality evaluation values for test recording spots of the compared and calculated strategy.

4-2. Processing Order for Realizing Adjustment Operation of Fourth Embodiment FIG. 14 is a flowchart illustrating the order of the process for realizing the adjustment operation according to the fourth embodiment, and exemplifies the order of the process for realizing the adjustment operation described in FIGS. 12A and 12B.

Figure 14:
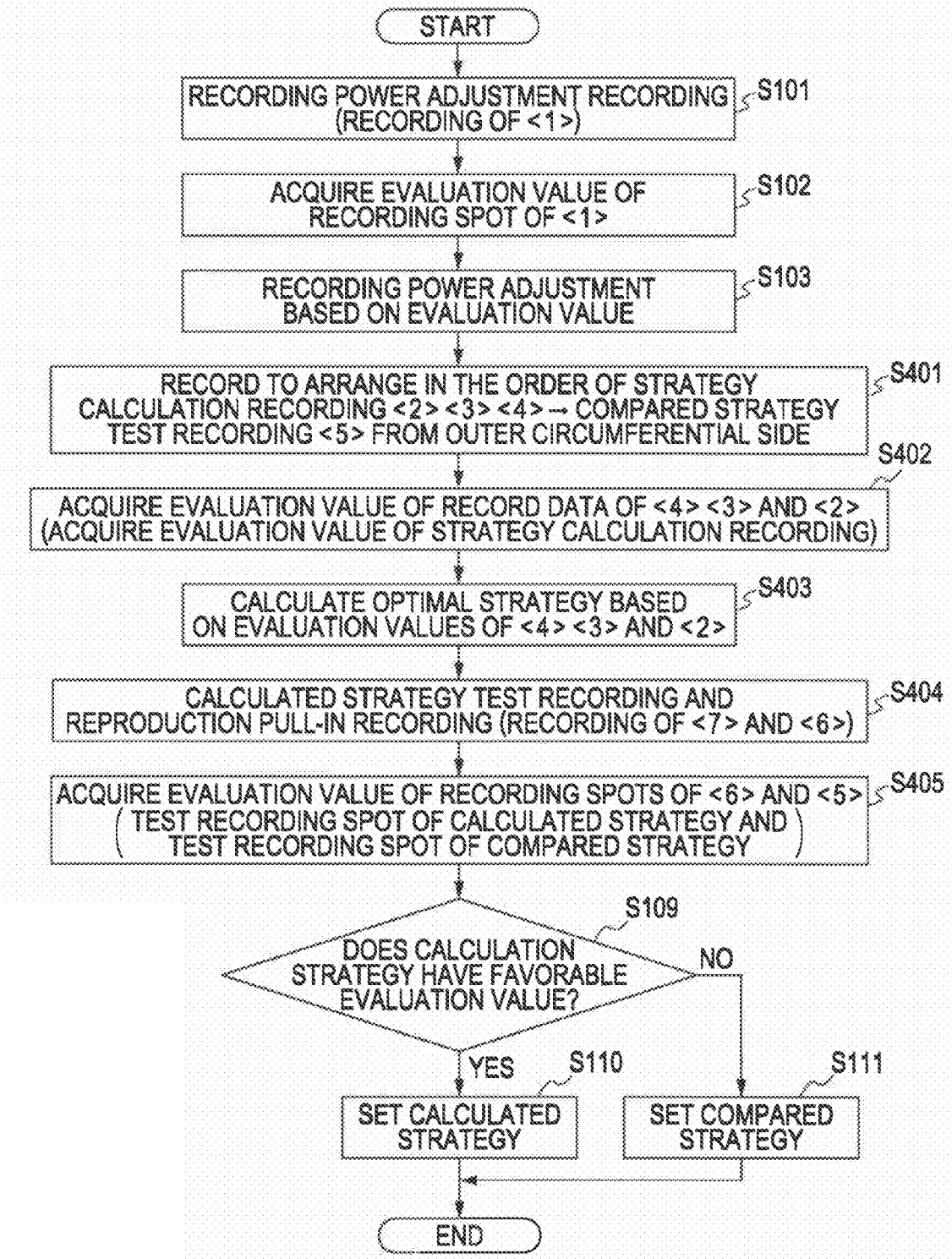
FIG. 14 is a flowchart illustrating the order of a process to be performed for realizing an adjustment operation according to the fourth embodiment of the present invention.

In FIG. 14 also, the process for realizing the adjustment operation is executed by the system controller 10 shown in FIG. 1 based on the program accommodated in, for example, internal memory.

In addition, in FIG. 14, processes that have the same content are given with the same step numbers as those which have been described in the embodiments hitherto, and description thereof will not be repeated.

The order of the process shown in FIG. 14 is different from that of the third embodiment shown in FIG. 11 above in that a process from Step S401 to Step S405 is performed instead of a series of a process of Steps S201→S301→S203→S204→S205.

Specifically, in this case, after the adjustment process of the optimized recording power is performed in Step S103, in Step S401, each recording is performed so as to be arranged in the order of "strategy calculation recording <2> <3> <4>→compared strategy test recording <5>" from the outer circumferential side.

Subsequently, in Step S402, a process is executed for acquiring evaluation values of recording spots of <4>, <3>, and <2> (which is the acquisition of evaluation values of strategy calculation recording).

As described before, in reading operation at that time, the recording spot of the compared strategy test recording <5> is used in a reproduction pull-in process.

In addition, in the next Step S403, an optimized strategy is calculated based on the evaluation values of <4>, <3>, and <2>.

Furthermore, in the next Step S404, as a process for performing calculated strategy test recording and reproduction pull-in recording (recording of <7> and <6>), each recording is performed to be arranged in the order of "reproduction pull-in recording <7>→calculated strategy test recording <6>" from the outer circumferential side.

Subsequently, in Step S405, a process is executed for acquiring evaluation values of the recording spots of <6> and <5> (the test recording spot of the calculated strategy, and recording spot of the compared strategy).

In this case, since the calculated strategy test recording <6> and the compared strategy test recording <5> are adjacent to each other in the circumferential direction (refer to FIGS. 12A and 12B), reading of such recording spots can be performed consecutively (as a series of reading operations).

5. Modified Example

Hereinabove, the embodiments of the present invention have been described, but the present invention is not limited to the specific examples described above.

For example, in the description hitherto, in response to the determination that the signal quality has not been improved further in the case where the calculated strategy is set than in the case where the compared strategy is set (in other words, determined that the calculated strategy has not been correctly calculated), the case where the compared strategy is set was instantly exemplified. However, in response to the determination that the signal quality has not been improved in the case where the calculated strategy is set, the calculation of the strategy can be retried.

Figure 15:
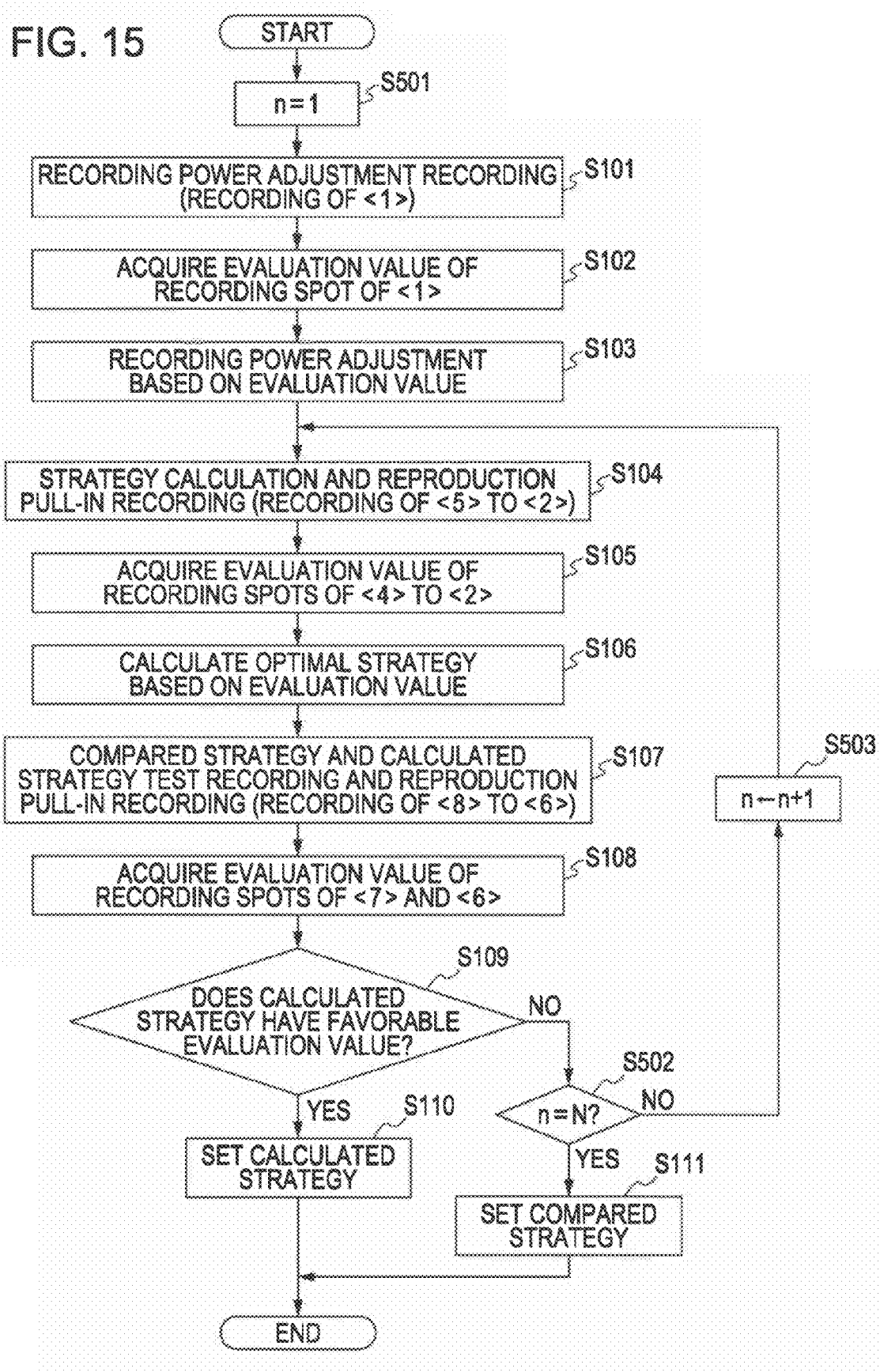
FIG. 15 is a flowchart illustrating the order of a process to be performed for realizing an adjustment operation as a modified example where a retry operation is performed.

The flowchart of FIG. 15 shows the order of the process for realizing the adjustment operation as a modified example for such a retry operation.

In addition, the drawing also shows the order of a process executed by the system controller 10.

Furthermore, the drawing shows the order of a process when the retry operation is applied for the first embodiment.

As understood by comparing FIG. 15 and FIG. 3, in the order of the process as the modified example, Step S501 is performed before the execution of Step S101 in the order of the process in the first embodiment, and Step S502 is to be executed according to a negative result obtained in Step S109.

In Step S501, a process is performed in which a count value for the number of retries n is set to "1" (n=1). Here, the process of Step S501 is performed before the execution of Step S101, but the process of Step S501 is supposed to be performed at least before the execution of Step S502.

In addition, in Step S502, it is determined whether n=N or not, in other words, whether the count value for the number of retries n has reached the upper limit number of retries N or not.

In Step S502, when a negative result of n≠N is obtained, the process advances to Step S503 as in the drawing to increase the count value for the number of retries n by 1 (n←n+1), and the process returns to Step S104.

On the other hand, in Step S502, when a positive result of n=N is obtained, the process advances to Step S111 to execute a process of setting the compared strategy.

By performing such a process, when a negative result to which the calculated strategy has an unfavorable evaluation value is obtained in Step S109, the process of calculating the strategy and the determination process of Step S109 are retried. At this moment, the number of retries is limited to the upper limit number N.

To describe for confirmation, when the disc D is a recordable type medium, re-writing of signals is not possible. Thus, the positions for recording performed in Step S104 and Step S107, which are executed as a retry, may be shifted to non-recording areas for each retry in sequence.

In addition, when the disc D is a re-writable medium, recording content of previous time can be erased in the strategy calculation and each recording for the determination of Step S109, and thus, each operation can be performed in the same area as the previously used area. However, as understood from the later description, since it is effective that each recording performed as a retry operation is performed by using a different area from the previously used area, retry recording is performed by using an unused area in sequence also on the re-writable medium. After all, the operation is performed by changing the position for each retry.

Here, FIG. 15 exemplifies that the retry operation is applied to the case of the first embodiment, but the same retry operation can be realized by inserting the process of Steps S501, S502, and S503 in the same manner for other embodiments.

By performing the retry operation as above, the strategy calculation can be performed again when the calculated strategy is not correctly calculated.

Here, as described above, one of the reasons that the strategy calculation is incorrect is that a part of the test writing area for the strategy calculation may receive the influence of disturbance such as a defect. In consideration of this point, the test writing for the strategy calculation can be performed again by changing the positions in sequence by the retry operation as above. Furthermore, by performing recalculation of the strategy based on the result, it is possible to avoid the influence of disturbance and induce correct calculation of the strategy.

In short, according to the retry operation, when a part of the test writing for the strategy calculation receives the influence of disturbance by chance and the strategy is incorrectly calculated, it is possible to raise a possibility that the operation that the compared strategy is instantly set is avoided, and the strategy which is more favorable than the compared strategy is set.

As understood from this point, according to the retry operation, it is possible to raise a possibility to perform recording by favorable signal quality.

In addition, a definite statement has been avoided in description hitherto, but specifically, adjustment in a front edge position and a rear mark edge position of a laser driving pulse can be exemplified as the write strategy adjustment. Or, edge positions to be adjusted are not limited to the front and the rear, but for example, edge positions of multiple pulses are possible.

Actually, a pulse edge which is effectively used in adjusting the front edge and the rear edge of a generated mark may be appropriately selected in accordance with the type of a medium.

In addition, it is not limited only to edge positions of a laser driving pulse, but the amplitude thereof can be adjusted.

For example, when a step-shaped pulse is used, the level of difference in steps is adjusted, but such adjustment also belongs to the category of the write strategy adjustment.

From the description above, the write strategy adjustment mentioned in the present specification can be defined as adjustment for the parameter of the laser driving pulse that enables the adjustment in the edge positions of a mark formed on an optical disc.

In addition, in the description hitherto, a case has been exemplified where the compared strategy used as a compared object of the calculated strategy is a reference strategy recorded in advance on, for example, an optical disc or a recording/reproducing device, but as "a waveform adjusting parameter as a compared object" mentioned in the embodiment of the present invention, for example, a strategy calculated by the previous strategy calculation can be used.

In the embodiment of the present invention, as "a waveform adjusting parameter as a compared object", other waveform adjusting parameters can be employed as long as the parameters are suitable as compared objects in determining whether the calculation of a waveform adjusting parameter for improvement in signal quality has been correctly performed, even if the parameters are other than the reference strategy or the previously calculated strategy.

In addition, in the description hitherto, the case has been exemplified in which the quality evaluation value used in the process of calculating the strategy and the quality evaluation value used for determining whether the calculated strategy is correctly calculated are the same as each other by a jitter value, but each of the quality evaluation values can be used separately.

For example, the evaluation value used in the process of calculating the strategy can be a "mark edge position error" as disclosed in Japanese Unexamined Patent Application Publication No. 2008-84376, and the evaluation value used for determining whether the calculated strategy is correctly calculated can be a jitter value.

In addition, as the quality evaluation value in the embodiment of the present invention, in addition to the "edge position error" and the jitter value as above, for example, other values can be used such as the standard deviation of the differential metrics, and RPSNR as mentioned above.

Whatever it may be, as the quality evaluation value in the embodiment of the present invention, any value can be used which is an index of the recording signal quality, which is generated from a signal read from an optical recording medium.

The present application contains subject matter related to that disclosed in Japanese Priority Patent Application JP 2009-160589 filed in the Japan Patent Office on Jul. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording/reproducing device comprising:
an optical head unit which performs writing and reading of information expressed by marks and spaces on an optical recording medium by irradiating laser light onto the optical recording medium;
a laser driving pulse generating unit that generates a laser driving pulse according to the recorded information to supply a laser driving signal to the optical head unit, and executes the irradiation of the laser light onto the optical head unit for recording;
an evaluation value calculating unit that calculates a quality evaluation value, which is an index of recording signal quality based on a signal read from the optical recording medium by the optical head unit; and
an adjustment controlling unit that performs an adjustment setting of the laser driving pulse generated in the laser driving pulse generating unit,
wherein, with respect to waveform adjusting parameters for the laser driving pulse, after the adjustment controlling unit executes test writing for each waveform adjusting parameter by setting different waveform adjusting parameters in sequence, the adjustment controlling unit calculates a waveform adjusting parameter for the improvement of signal quality based on a result from reading of a signal for the test writing, and after the adjustment controlling unit executes test writing under a setting of each waveform adjusting parameter by setting a calculated waveform adjusting parameter calculated as such and a comparing target waveform adjusting parameter defined as a comparing object of the calculated waveform adjusting parameter in the laser driving pulse generating unit in sequence, the adjustment controlling unit determines whether the signal quality has been improved further in a case where the calculated waveform adjusting parameter is set than in a case where the comparing target waveform adjusting parameter is set based on a result from the acquisition of a quality evaluation value for the signal for the test writing by the evaluation value calculating unit to perform an adjustment setting of the laser driving pulse based on the determination result.

2. The recording/reproducing device according to claim 1, wherein the optical recording medium is a disc-shaped recording medium, and the adjustment controlling unit executes test writing for each of the waveform adjusting parameters so that an angular position at which a test writing position of the comparing target waveform adjusting parameter is arranged and an angular position at which a test writing position of the calculated waveform adjusting parameter is arranged on the optical recording medium coincide with each other.

3. The recording/reproducing device according to claim 2, wherein a test area for the test writing is provided in the outermost circumferential part on the optical recording medium, one cycle of a track is equivalent to five clusters in the test area, and the test area is decided to be used by being pushed to a side of higher address numbers, test writing is decided to be performed for a total of three types of a first to a third waveform adjusting parameters when a waveform adjusting parameter is calculated for the improvement of the signal quality, the adjustment controlling unit causes the angular position at which the test writing position for the comparing target waveform adjusting parameter is arranged to coincide with the angular position at which the test writing position for the calculated waveform adjusting parameter is arranged by performing signal writing after a 2-cluster test writing signal recording area where a first waveform adjusting parameter is set, a 2-cluster test writing signal recording area where a second waveform adjusting parameter is set, a 2-cluster test writing signal recording area where the comparing target waveform adjusting parameter is set, a 2-cluster test writing signal recording area where a third waveform adjusting parameter is set, a 1-cluster signal recording area which is used as a pull-in area during signal reading, a 2-cluster signal recording area where the calculated waveform adjusting parameter is set, and a 1-cluster signal recording area which is used as a pull-in area during signal reading are arranged in the order of increasing address numbers in the test area.

4. The recording/reproducing device according to claim 2, wherein a test area for the test writing is provided in the innermost circumferential part on the optical recording medium, one cycle of a track is equivalent to two clusters in the test area, and the test area is decided to be used by being pushed to a side of higher address numbers, test writing is decided to be performed for a total of three types from a first to a third waveform adjusting parameters when a waveform adjusting parameter is calculated for the improvement of the signal quality, the adjustment controlling unit causes the angular position at which the test writing position for the comparing target waveform adjusting parameter is arranged to coincide with the angular position at which the test writing position for the calculated waveform adjusting parameter is arranged by performing signal writing after a 2-cluster test writing signal recording area where a first waveform adjusting parameter is set, a 2-cluster test writing signal recording area where a second waveform adjusting parameter is set, a 2-cluster test writing signal recording area where a third waveform adjusting parameter is set, a signal recording area which is a 2-cluster test writing signal recording area where the comparing target waveform adjusting parameter is set and also used as a pull-in area during signal reading, a 2-cluster signal reading area where the calculated waveform adjusting parameter is set, and a 2-cluster signal recording area which is used as a pull-in area during signal reading are arranged in the order of increasing address numbers in the test area.

5. The recording/reproducing device according to claim 1, wherein the optical recording medium is a disc-shaped recording medium, and the adjustment controlling unit causes conditions for reading/non-reading of adjacent tracks to coincide with each other during the acquisition of the quality evaluation values for the test writing position of the comparing target waveform adjusting parameter and the test writing position of the calculated waveform adjusting parameter to perform execution control of the test writing and the acquisition of the quality evaluation values for each of the waveform adjusting parameters.

6. The recording/reproducing device according to claim 5, wherein a test area for the test writing is provided in the outermost circumferential part on the optical recording medium, one cycle of a track is equivalent to five clusters in the test area, and the test area is decided to be used by being pushed to a side of higher address numbers, test writing is decided to be performed for a total of three types from a first to a third waveform adjusting parameters when a waveform adjusting parameter is calculated for the improvement of the signal quality, the adjustment controlling unit causes signal writing to be executed after a 2-cluster test writing signal recording area where a first waveform adjusting parameter is set, a 2-cluster test writing signal recording area where a second waveform adjusting parameter is set, a 2-cluster test writing signal recording area where the comparing target waveform adjusting parameter is set, a 2-cluster test writing signal recording area where a third waveform adjusting parameter is set, and a 1-cluster signal recording area which is used as a pull-in area during signal reading are arranged in the order of increasing address numbers in the test area, the calculation of a waveform adjusting parameter for the improvement of the signal quality and the acquisition of a quality evaluation value for the comparing target waveform adjusting parameter are performed by using the writing signal, and thereafter, the adjustment controlling unit causes signal writing to be executed after a 2-cluster signal recording area where the calculated waveform adjusting parameter is set, and a 1-cluster signal recording area which is used as a pull-in area during signal reading are arranged in the order of increasing address numbers next to the pull-in signal recoding area to acquire a quality evaluation value for the calculated waveform adjusting parameter.

7. The recording/reproducing device according to claim 5, wherein
a test area for the test writing is provided in the innermost circumferential part on the optical recording medium, one cycle of a track is equivalent to two clusters in the test area, and the test area is decided to be used by being pushed to a side of higher address numbers,
test writing is decided to be performed for a total of three types from a first to a third waveform adjusting parameters when a waveform adjusting parameter is calculated for the improvement of the signal quality,
the adjustment controlling unit causes signal writing to be executed after a 2-cluster test writing signal recording area where a first waveform adjusting parameter is set, a 2-cluster test writing signal recording area where a second waveform adjusting parameter is set, a 2-cluster test writing signal recording area where a third waveform adjusting parameter is set, and a signal recording area which is a 2-cluster test writing signal recording area where the comparing target waveform adjusting parameter is set and also used as a pull-in area during signal reading, are arranged in the order of increasing address numbers in the test area,
a waveform adjusting parameter for the improvement of the signal quality is calculated by using a test writing signal in which the first to third waveform adjusting parameter are set, and
thereafter, the adjustment controlling unit causes signal writing to be executed after a 2-cluster signal recording area where the calculated waveform adjusting parameter is set, and a 2-cluster signal recording area which is used as a pull-in area during signal reading are arranged in the order of increasing address numbers next to the test writing signal recoding area of the comparing target waveform adjusting parameter to acquire quality evaluation values for the calculated waveform adjusting parameter and the comparing target waveform adjusting parameter.

8. The recording/reproducing device according to claim 1, wherein the adjustment controlling unit sets the comparing target waveform adjusting parameter when it is determined that the signal quality has not been improved in a case where the calculated waveform adjusting parameter is set.

9. The recording/reproducing device according to claim 1, wherein the adjustment controlling unit retries calculation of a waveform adjusting parameter for the improvement of the signal quality when it is determined that the signal quality has not been improved in a case where the calculated waveform adjusting parameter is set.

10. The recording/reproducing device according to claim 9, wherein the adjustment controlling unit determines whether the number of retries for calculating the waveform adjusting parameter has reached the upper limit, and when the number of retries has reached the upper limit, the comparing target waveform adjusting parameter is set.

11. A laser driving pulse adjusting method in a recording/reproducing device including an optical head unit which performs writing and reading of information expressed by marks and spaces on an optical recording medium by irradiating laser light onto the optical recording medium, a laser driving pulse generating unit that generates a laser driving pulse according to the recorded information to supply a laser driving signal to the optical head unit, and executes the irradiation of the laser light onto the optical head unit for recording, an evaluation value calculating unit that calculates a quality evaluation value, which is an index of recording signal quality based on a signal read from the optical recording medium by the optical head unit, and an adjustment controlling unit that performs an adjustment setting of the laser driving pulse generated in the laser driving pulse generating unit, the method comprising the steps of:
calculating a waveform adjusting parameter for the improvement of signal quality based on a result from reading of a signal for test writing after executing the test writing for each waveform adjusting parameter by setting different waveform adjusting parameters in sequence, with respect to the waveform adjusting parameters for the laser driving pulse; and
determining whether the signal quality has been improved further in a case where the calculated waveform adjusting parameter is set than in a case where the comparing target waveform adjusting parameter is set based on a result from the acquisition of a quality evaluation value for a signal for test writing by the evaluation value calculating unit to perform an adjustment setting of the laser driving pulse based on the determination result after executing the test writing under a setting of each waveform adjusting parameter by setting a calculated waveform adjusting parameter calculated as such and a comparing target waveform adjusting parameter defined as a comparing object of the calculated waveform adjusting parameter in sequence.

* * * * *